United States Patent [19]

Kratochvil

[11] Patent Number: 5,063,073
[45] Date of Patent: Nov. 5, 1991

[54] C-GEL COMPOSITE FOOD PRODUCTS

[75] Inventor: John F. Kratochvil, Oak Brook, Ill.

[73] Assignee: Kraft General Foods, Inc., Glenview, Ill.

[21] Appl. No.: 563,499

[22] Filed: Aug. 7, 1990

Related U.S. Application Data

[60] Division of Ser. No. 307,069, Feb. 6, 1989, abandoned, which is a continuation-in-part of Ser. No. 658,618, Oct. 9, 1984, Pat. No. 4,684,533, and a continuation-in-part of Ser. No. 81,115, Aug. 3, 1987, abandoned.

[51] Int. Cl.$^5$ .......................... A23L 1/05; A23L 1/052
[52] U.S. Cl. ..................................... 426/573; 426/574; 426/575; 426/576; 426/615; 426/648; 426/656; 426/643; 426/641; 426/659; 426/413; 426/414
[58] Field of Search ............... 426/575, 582, 601, 656, 426/573, 576, 602, 613, 574, 615, 648, 643, 641, 659, 660, 413, 414

[56] References Cited

U.S. PATENT DOCUMENTS

| | | |
|---|---|---|
| 2,604,406 | 7/1952 | Blihovde . |
| 3,396,039 | 8/1963 | Leo et al. . |
| 3,404,987 | 10/1968 | Kooistra et al. . |
| 3,407,076 | 10/1968 | Ganz . |
| 3,499,768 | 3/1970 | Motrano . |
| 3,563,761 | 2/1971 | Ellinger . |
| 3,615,645 | 10/1971 | Forkner . |
| 3,615,662 | 10/1971 | Ellinger . |
| 3,617,302 | 11/1971 | Collins . |
| 3,620,757 | 11/1971 | Ellinger . |
| 3,809,764 | 5/1974 | Gabby et al. . |
| 3,842,062 | 10/1974 | Eastman . |
| 3,929,892 | 12/1975 | Hynes et al. . |
| 4,012,533 | 3/1977 | Jonas . |
| 4,089,981 | 5/1978 | Richardson . |
| 4,089,987 | 5/1978 | Chang . |
| 4,244,983 | 1/1981 | Baker . |
| 4,303,691 | 12/1981 | Sand et al. . |
| 4,416,904 | 11/1983 | Shannon . |
| 4,563,360 | 1/1986 | Soucie et al. ..................... 426/574 |

OTHER PUBLICATIONS

Food Engineering, Jun. 1977.
Marine Colloids, Inc., Preliminary bulletin.
FMC Corporation—Marine Collids Division—Product Information Bulletin.
Xanthan Gum—a New and Unique Colloidal Stabilizer for the British Food Industry, Food Trade Review, Nov. 1973.
Lin, C. F., "Stabilization of Casein Micelles by Carrageenan", Chem. Abstr. 73 (1970).
Lin, C. F., "Interaction of Sulfated Polysaccharides with Proteins", Food Colloids, Chapter 7, pp. 320–346.
MacMullan, E. A. et al., "The Precipitation Reaction of Carrageenan with Gelatin", Journal of Colloid Science, 18, pp. 526–537 (1963).
Glickman, M. et al., "Gum Arabic IX. Coacervation", pp. 234–259.
"Xanthan Gum Offers Versatility, Safety", Food Technology, Jun. 1974.
"V. Interaction Between Xanthan Gum and Galactomannans", Becket: Xanthan gum, 2nd Ed. pp. 21–25.
Kovacs, Peter, "Useful Incompatability of Xanthan Gum with Galactomannans", based on a paper presented at the Carbohydrates Division Symposium, 32nd Annual Meeting of the Institute of Food Technologists, Minneapolis, Minn., May 21–25, 1972.

(List continued on next page.)

Primary Examiner—Marianne Cintins
Attorney, Agent, or Firm—Fitch, Even, Tabin & Flannery

[57] ABSTRACT

Novel C-Gel food products comprising an aqueous gelatin kappa carrageenan matrix and a dispersed food product selected from the groups consisting of meat, seafood, vegetable, fruit, synthetic protein fiber, chocolate and mixtures thereof, in which the gelatin and carrageenan are present as a structurally firm continuous aqueous carrageenan/gelatin phase matrix at refrigeration temperature.

12 Claims, 10 Drawing Sheets

OTHER PUBLICATIONS

Kelco Company, Technical Bulletin, 11/75 "Superior Stabilization of Cottage Cheese Dressing with GFS".

Kelco Company, Technical Bulletin, 11/75 "GFS in Cream Cheese and Neufchatel Cheese".

Kelco Company, Technical Bulletin, 4/76, "GFS in Pasteurized Process Cheese Spread".

Haga, S. et al., "Effects of Single Step, Two-Step and Three-Step Heatings on Gel Formation of the Mixture of Myosi B with Soybean Protein CIF".

Yang and Taranto, "Morphological and Textural Comparisons of Soybean Mozzarella Cheese Analogs Prepared with Different Hydrocolloids", Food Microstructure, vol. 1, pp. 223–231 (1982).

Taranto and Yang, "Morphological and Textural Characterizations of Soybean Mozzarella Cheese Analogs", Scanning Electron Microscopy, pp. 483–492 (1981).

Yang and Taranto, "Textural Properties of Mozzarella Cheese Analogs Manufactured from Soybeans", Journal of Food Science, vol. 47, pp. 906–910 (1982).

C-GEL COMPOSITE FOOD PRODUCTS

This application is a divisional of application Ser. No. 307,069 filed Feb. 6, 1989; now abandoned which is a continuation-in-part of application Ser. No. 658,618 filed Oct. 9, 1984, now U.S. Pat. No. 4,684,533 and a continuation-in-part of application Ser. No. 081,115 filed Aug. 3, 1987, now abandoned, which are incorporated by reference herein.

The present invention is directed to composite food products having a firm, flavored continuous matrix and which may contain a discontinuous phase such as meat, seafood, vegetable, fruit and/or protein fibers.

BACKGROUND OF THE INVENTION

Imitation food products such as imitation cheeses are conventionally manufactured from edible components such as casein, calcium caseinate, or sodium caseinate, which permit processing at elevated temperature, and yield a firm, stable product at refrigeration temperatures.

However, casein and caseinates have the disadvantage of being relatively expensive and are subject to the vagaries of excess milk production. Accordingly, there have been substantial efforts to provide food products having decreased or minimal casein-caseinate requirements. These efforts have included attempts to develop imitation cheese products which utilize relatively inexpensive soy, cottonseed and peanut protein as a partial or total replacement for the casein-caseinate. Unfortunately, such relatively inexpensive vegetable proteins may tend to impart characteristic undesirable flavors to the food product, and also result in difficulties in the provision of desirable processing properties or product texture. Work has been carried out to produce soy proteins having more acceptable flavor for imitation cheese products, and efforts have been made to utilize carrageenan to improve the texture of imitation cheese products incorporating vegetable proteins, with combinations of soy and sodium caseinate with carrageenan being utilized in efforts to obtain various desired textures. In this regard, U.S. Pat. No. 4,303,691 to Sand, et al. is directed to a proteinaceous food product intended to simulate cheese, comprising a blend of 25 percent soy isolate, cold insoluble soy fraction, or mixtures thereof, together with specified amounts of gelatin, hydrocolloid gums such as xanthan - locust bean gum mixtures and carrageenans, fat, water, emulsifiers, salt, chelating agent, coloring agent and flavoring. According to Sand, et al., the cheese-like characteristics are believed to be attributable to the combination of the hydrocolloid gum with the soy protein, neither of which materials without the other, provides a product with such characteristics.

Similarly, U.S. Pat. No. 4,089,981 describes a low calorie imitation cheese loaf featuring cellulose fibers, but also comprising minor amounts of iota carrageenan, locust bean gum, guar gum and gelatin.

There has also been substantial effort directed to development of Mozzarella cheese analogs from soy protein, gelatin, fat and a variety of gums, such as gum arabic, xanthan-locust bean gum and guar gum such as described by Yang, et al., "Morphological and Textural Comparisons of Soybean Mozzarella Cheese Analogs Prepared with Different Hydrocolloids", Food Microstructure, Vol. 1 (1982), pp. 223-231; Taranto, et al., "Morphological and Textural Characterization of Soybean Mozzarella Cheese Analogs", Scanning Electron Microscopy, III, pp. 483-492, 1981.

Improved imitation cheese compositions which employ a carrageenan-gelatin matrix ("C-Gel") having desirable economics of manufacture together with desirable flavor and performance properties including texture, meltability, shredability and sliceability, are taught by U.S. patent application Ser. No. 658,618 filed Oct. 9, 1984.

However, a variety of additional flavorful, healthful and convenient sliced or sliceable food products which employ such a C-Gel matrix would be desirable. In this regard, various food products in firm, sliced form at ambient temperature (i.e., 70°-75° F.) or refrigeration temperature (i.e. 45° F.) such as pizza sauce or chili sauce food product slices which may be readily melted when heated, would be desirable as a principal component of a convenience pizza kit or hamburger topping, respectively. Similarly, firm, flavored composite food product slices such as fruit and/or chocolate flavored slices in which the structured C-Gel component is compatible with the chocolate or other flavoring ingredient, would be desirable. Moreover, sliced or sliceable products containing fruit, vegetable and/or protein components, which may be readily manufactured and processed, would also be desirable.

Accordingly, it is an object of the present invention to provide novel composite C-Gel products having excellent economy, flavor and performance characteristics. It is a further object to provide composite C-Gel products and methods for preparing such products, which incorporate wholesome food ingredients in the provision of novel highly palatable food products. These and other objects of the present invention will become apparent from the following detailed description and the accompanying drawings.

DESCRIPTION OF THE INVENTION

Figure 1:
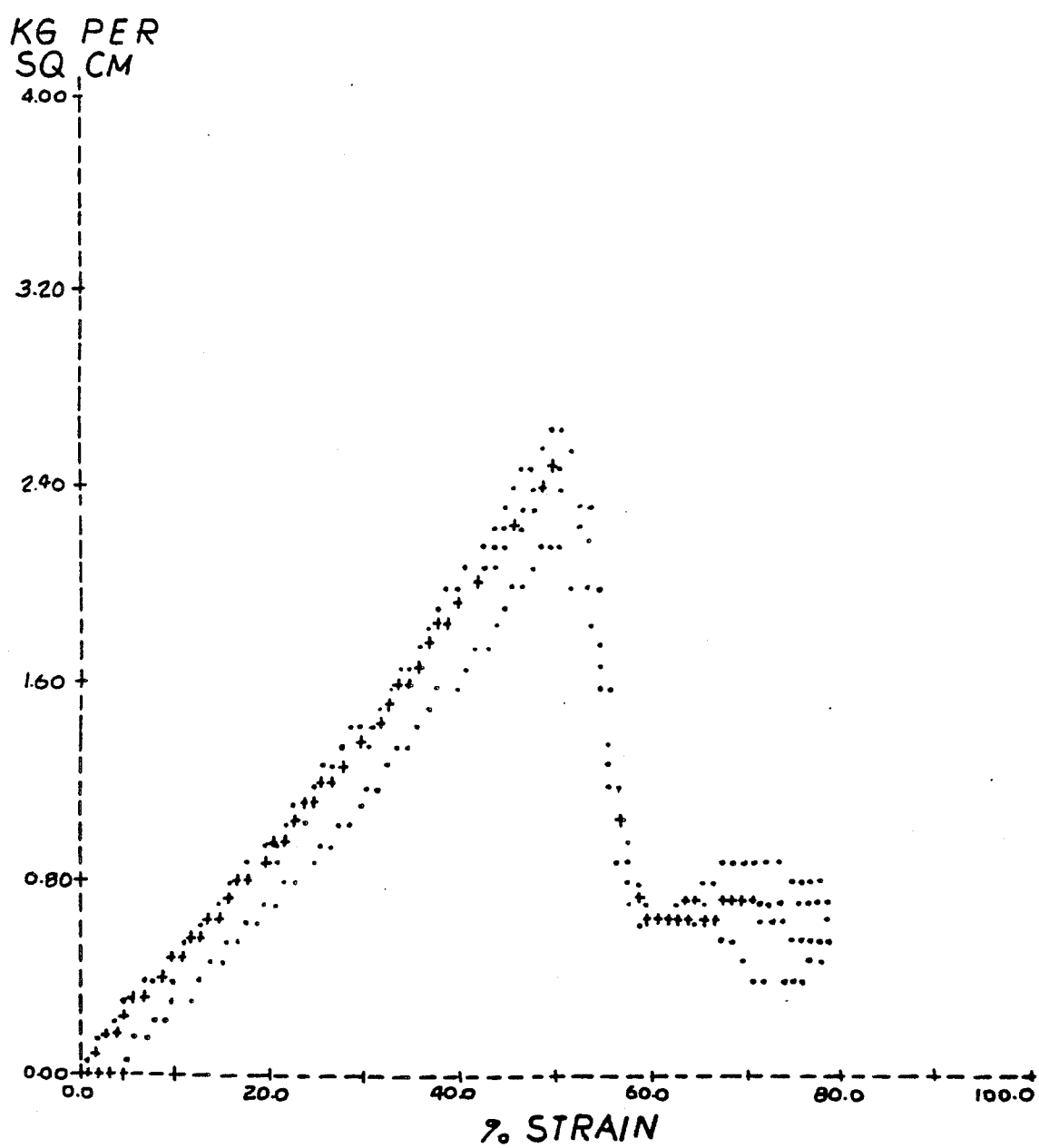
FIG. 1 is a graphic representation of the texture profile analysis force versus percent strain properties of a C-Gel matrix measured at 72° F.
Figure 2:
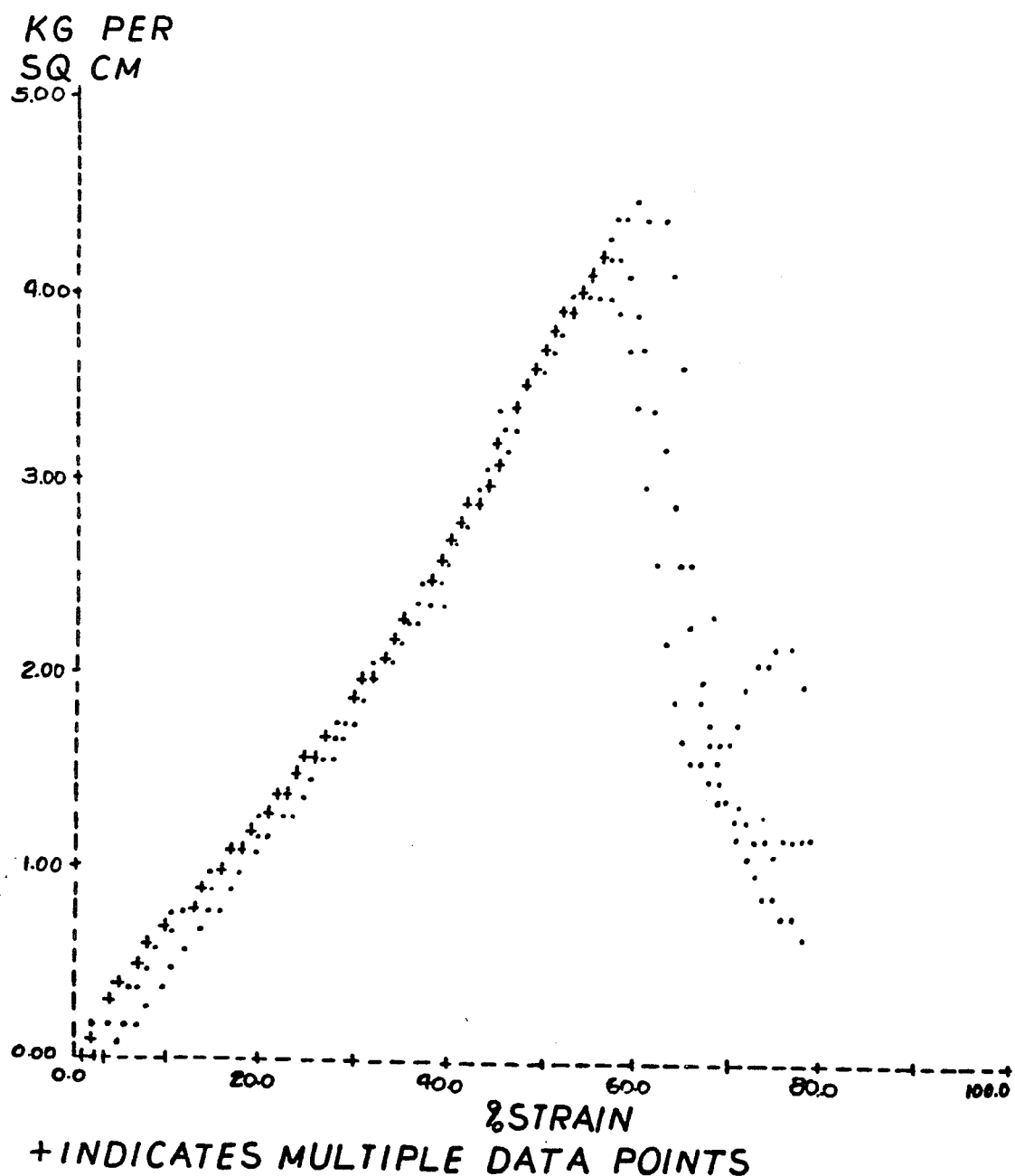
FIG. 2 is a graphic representation of the texture profile analysis force versus percent strain properties of a C-Gel matrix, measured at 45° F.
Figure 3:
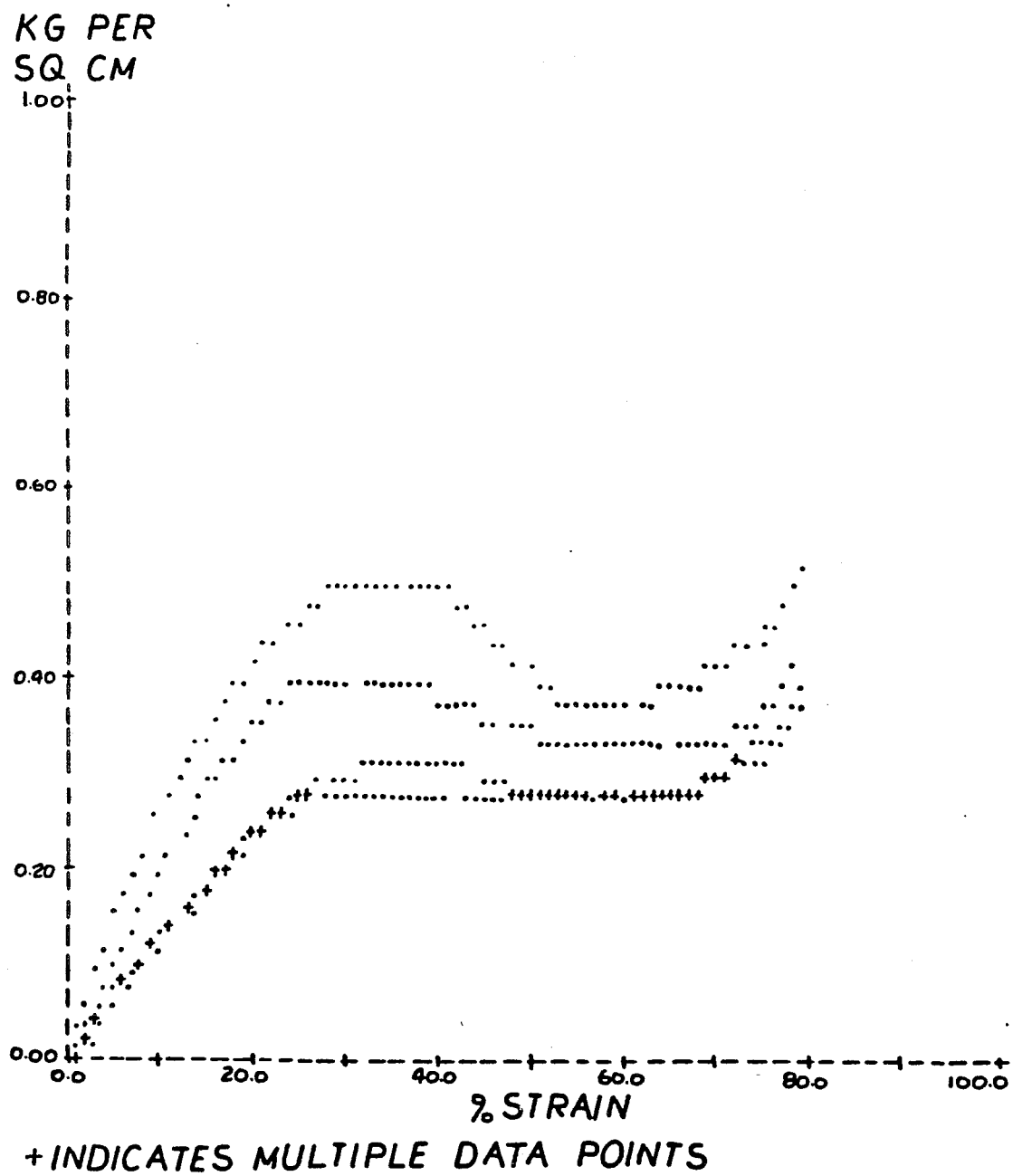
FIG. 3 is a graphic representation of the texture profile analysis force versus percent strain properties of an embodiment of a composite C-Gel product containing a xanthan protein fiber complex component in accordance with the present invention measured at 72° F.
Figure 4:
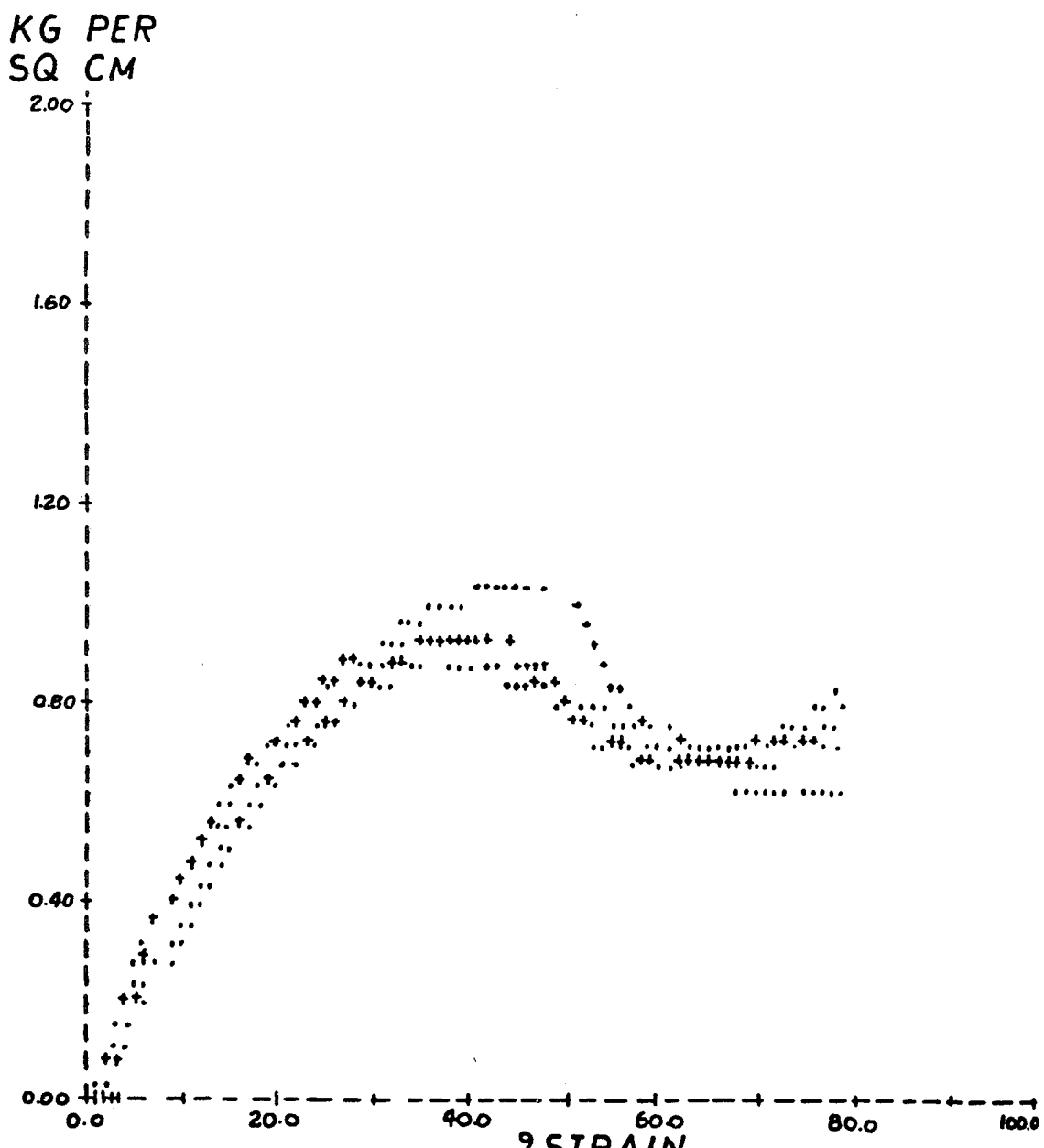
FIG. 4 is a graphic representation of the texture profile analysis force versus percent strain properties of an embodiment of a composite C-Gel product containing a xanthan protein fiber complex component in accordance with the present invention measured at 45° F.
Figure 5:
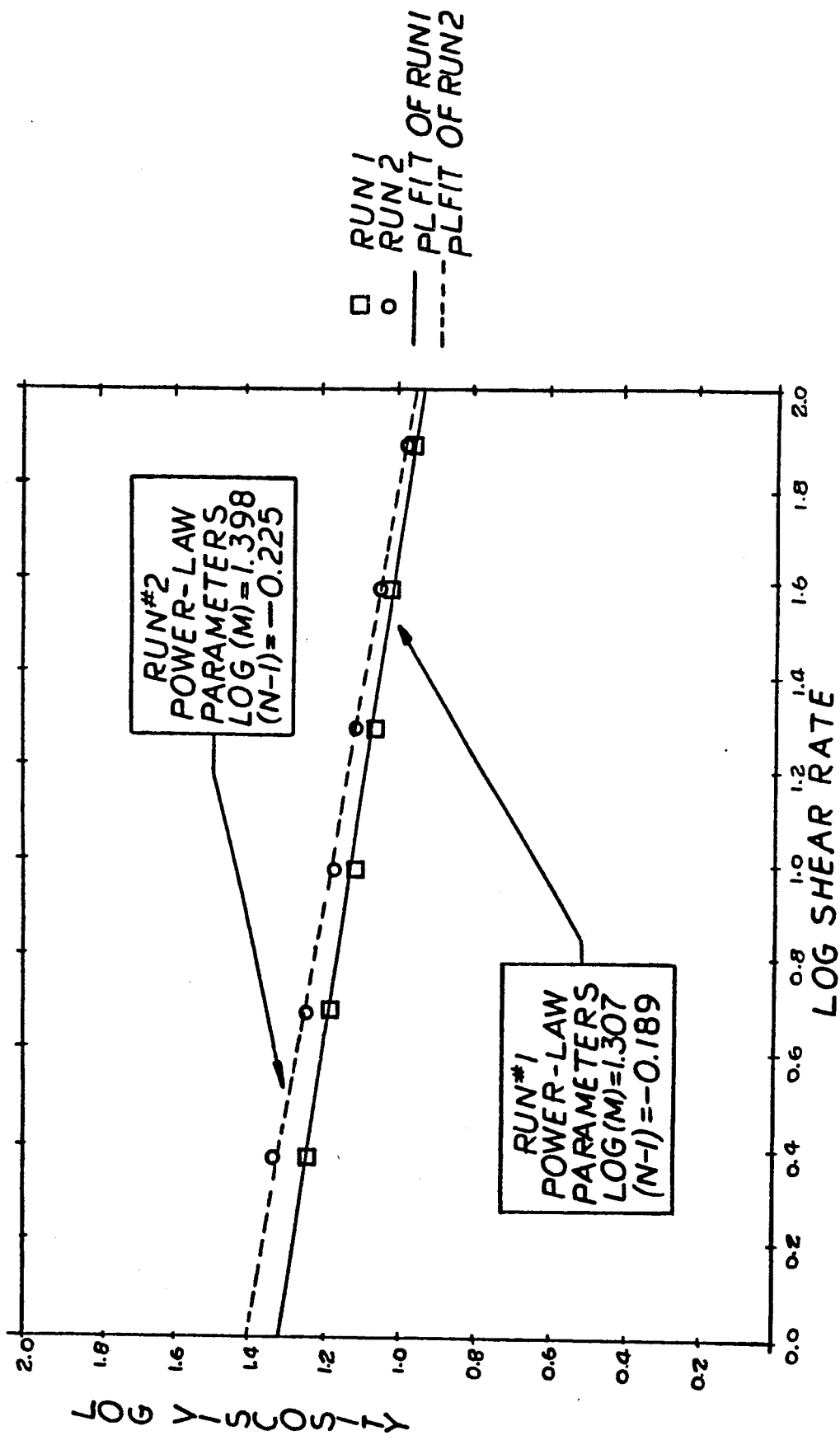
FIG. 5 is a graphic representation of the log viscosity versus log shear rate of the C-Gel matrix of FIGS. 1 and 2, measured at 80° C.
Figure 6:
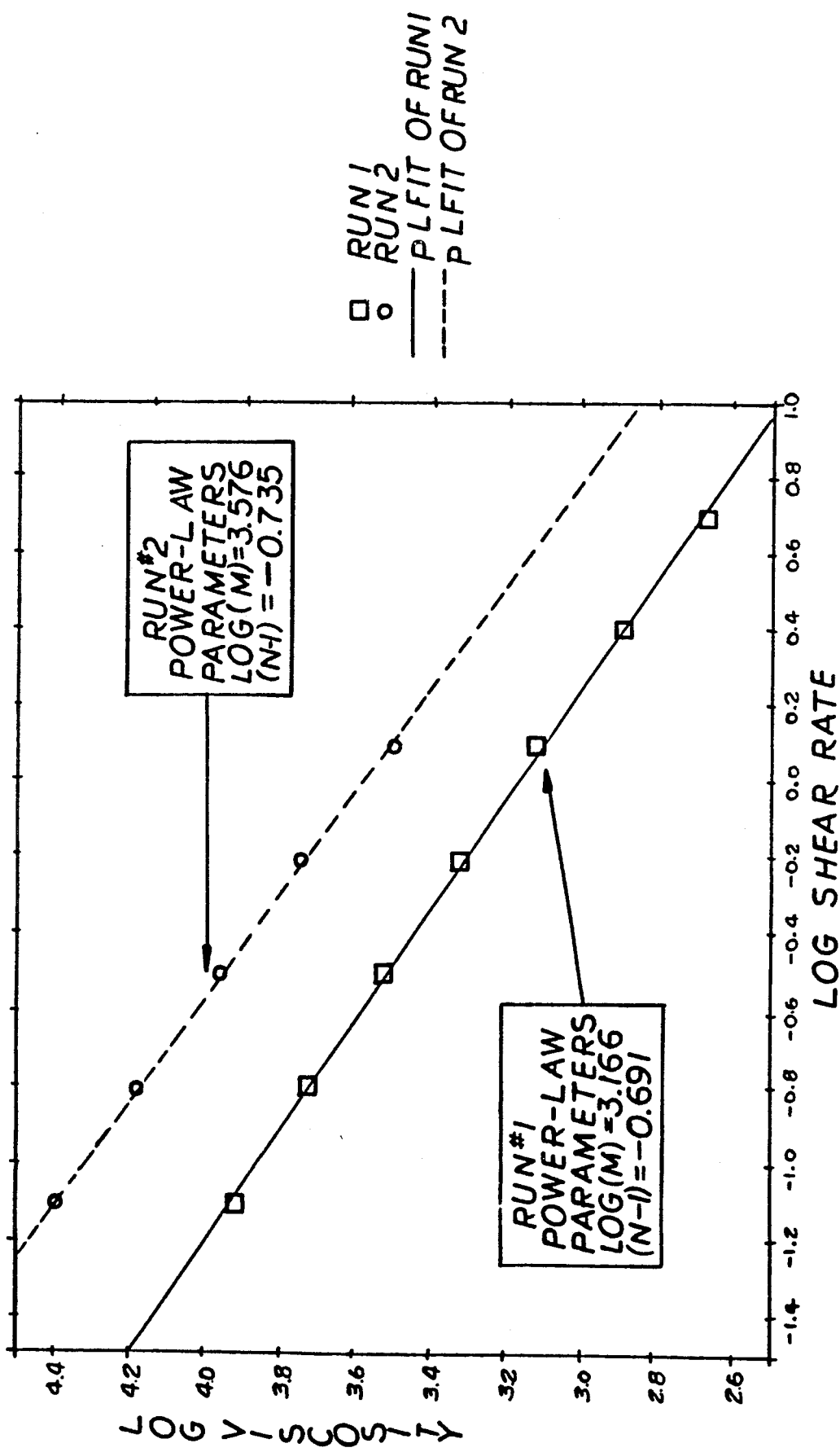
FIG. 6 is a graphic representation of the log viscosity versus log shear rate of the C-Gel composite product of FIGS. 3 and 4, measured at 80° C.

Generally in accordance with the present invention, composite C-Gel products are provided which comprise at least about 20 percent by weight of an aqueous, structurally firm, gelatin-carrageenan continuous-phase ("C-Gel") matrix, and at least about 20 percent by weight of a dispersed food component desirably selected from the group consisting of protein, fat, and carbohydrate solids, such as meats, seafoods, vegetables, fruits, sauces, dressings, protein fibers, polysaccharide/protein complex fibers, and mixtures thereof. For example, the dispersed food solids phase may desirably comprise food fibers such as synthetic xanthan-protein fibers such as disclosed in U.S. Pat. Nos. 4,563,360 and 4,559,233 or natural protein, fruit or vegetable fibers. Other polysaccharide/ protein complex fibers such as prepared from certain edible carboxymethyl cellulose materials and/or lambda carrageenan are also preferred fiber components for the composite food products of the present invention.

A dispersed fat phase, together with an emulsification agent may also be provided in the composite food products. The dispersed food solids component may be dissolved within the aqueous C-Gel matrix, or, for example in the case of fibrous components, may preferably be dispersed as a separate phase in the C-Gel product.

The C-Gel matrix, as will be more particularly described, comprises carrageenan and gelatin in a continuous aqueous phase which serves as a bland structural support and composite binding medium for other food ingredients when the product is cool (i.e., less than 75° F.) but permits the product to be mobile when hot (i.e., 160° F.). In this way, the C-Gel matrix mimics certain functional properties of casein but permits the formulation of a large number of sliced, or sliceable loaf products with little or no casein, cheese or other dairy products. Desirably the C-Gel matrix component of the composite food products in accordance with the present invention may have a structural fracturability of at least about one kilogram per square centimeter at refrigeration temperatures (i.e., 45° F.).

As indicated, the C-Gel matrix imparts mobility to the composite food product system when hot, and structural and/or binding properties to food products when cool. In addition, because the C-Gel matrix is capable of providing substantially no flavor of its own, it may serve as a carrier for almost any food ingredient without substantially altering the flavor of the ingredient. By utilizing an appropriate C-Gel matrix together with an appropriate dispersed food product, and flavoring components if desired, a large number of flavorful, healthful, and convenient sliced food products, such as sliced products for use in hot and cold sandwiches, chili hot dogs and mini pizzas, may be readily formulated and produced. The product may be aseptically packaged and have long shelf life. Loaf counterparts of such food products may also be produced, which may readily be sliced, diced, or shredded as desired.

In addition to the C-Gel matrix phase comprising carrageenan and gelatin, C-Gel products generally further comprise an additional dispersed phase containing vegetable or animal fat, emulsifiers, salt, flavorings and components such as, fruits, seafoods, meats, vegetables, synthetic protein-containing fibers, sauces, chocolate, and other food products which are combined with the C-Gel matrix to provide unique composite C-Gel food products.

As indicated, a principal feature of the present food compositions is a structurally firm, continuous phase gelatin-carrageenan matrix. In this regard, the composite matrix compositions in accordance with the present invention will generally comprise at least about 1.0 weight percent of medium to high bloom gelatin having a bloom strength of at least about 125, and at least about 0.5 weight percent of kappa carrageenan, based on the total weight of the C-Gel composite food product, combined as a structurally firm continuous aqueous phase matrix. The provision of a structurally firm, continuous phase matrix through the use of medium to high bloom strength gelatin, and kappa carrageenan is an important feature of the composite food products in accordance with the present invention. Firm C-Gel products may comprise at least about 1.5 weight percent of such gelatin and at least about 1.0 weight percent of kappa carrageenan.

Gelatins that may be used include medium to high bloom gelatins which are prepared by either acid or alkaline hydrolysis. Gelatin is conventionally provided by selective hydrolysis of collagen, a major intercellular protein constituent of connective tissue. Gelatin consists of a mixture of suitable proteins of high average molecular weight that are capable of forming a firm gel in an aqueous medium. Medium to high bloom strength gelatin will generally have a relatively high weight average molecular weight, such as at least about 100,000.

As indicated in accordance with the present invention, C-Gel composite food products are provided comprising a gelatin-carrageenan continuous phase matrix which is structurally firm at refrigeration temperatures, and in this regard the gelatin should be present at a level of at least about one weight percent based on the total weight of the composition. In some C-Gel composite food products, the preferred gelatin level may be as high as 12 weight percent, depending on the desired level of firmness in the selected composite C-Gel product.

Also important in the C-Gel matrix of the composite food products of the present invention is the provision of a kappa carrageenan component which, with the medium to high bloom strength gelatin, participates in the formation of the structurally firm continuous C-Gel phase of the composite food compositions. There are three general varieties of carrageenans including the kappa variety, the lambda variety and the iota variety. Kappa carrageenan is a necessary component in the continuous phase matrix of the gelled compositions of the present invention. Kappa carrageenan is one of the three principal forms of carrageenan. It is believed to be a hydrocolloid mainly consisting of a copolymer of alternating D-galactose (4) sulfate ester and 3,6 anhydro-D-galactose units, which may exist as a salt with potassium, sodium, magnesium and calcium ions. A small percentage of the 3,6 anhydro-D-galactose units are sulfated in the 2 position. In certain products, some lambda and/or iota carrageenan may be utilized in addition to the kappa carrageenan to impart special characteristics such as smoothness, but the kappa carrageenan-gelatin matrix is the principal structural and/or binding component.

The carrageenan should be present in the continuous C-Gel matrix in an amount of at least about 0.5 weight percent based on the total weight of the C-Gel composite product. In some C-Gel composite food products, the preferred carrageenan range is from about 1.0% to about 3.0% of the total weight of the C-Gel composite food product. In addition, the weight ratio of the carrageenan to the gelatin component should be in the range of from about 1:6 to about 3:1, on a dry basis.

An important component of the composite C-Gel products is the dispersed food product. Particular preferred C-Gel composite compositions may include fruits, vegetables, meats or other protein fibers, or mixtures thereof.

Composite C-Gel compositions which contain meat or other protein fibers or ionic polysaccharide-protein fibers are particularly preferred compositions in sliced form. The type of meat, protein or other fiber components which may be utilized in the fiber composite C-Gel products of the present invention include beef, pork, seafood, poultry such as chicken and turkey, and fish protein such as surimi, and mixtures thereof. Fibers of egg proteins, vegetable proteins such as soy protein and cottonseed protein, dairy proteins such as casein and whey proteins and microbial protein such as yeast protein and mixtures thereof may also desirably form a dispersed fiber component in the preferred C-Gel composite product in accordance with the present invention. Particularly preferred fiber compositions include fibrous complexes of an anionic polysaccharide with a protein, such as the xanthan protein complex fibers disclosed in U.S. Pat Nos. 4,563,360 and 4,559,233 which are incorporated herein by reference.

Desirably, the meat, other protein and/or polysaccharide/protein complex fiber component should be present in an amount of from about 5 to about 80 percent by weight, based on the weight of the total C-Gel composite product. The meat, other protein fiber components will typically comprise from about 10 percent to about 30 percent protein and from about 25 to about 80 percent water, by weight, based on the weight of the meat or other protein composition. The composition of the polysaccharide/protein complex fiber components may be varied as described hereinabove. However, dried meat or other protein components (e.g., fried bacon bits) having less than 25 weight percent water and proportionately higher protein levels may also be dispersed in the C-Gel matrix. Such dried protein components, however, will tend to at least partially rehydrate in contact with the continuous C-Gel matrix phase.

Composite C-Gel compositions which contain a homogeneous or dispersed fruit phase are also particularly preferred. In this regard, fruits such as apples, peaches, pears, bananas, grapes, citrus fruits such as oranges, lemons and grapefruit, and berries such as raspberries, strawberries, blueberries, may be incorporated as a dispersed phase in a C-Gel matrix in accordance with the present invention, to provide novel and delicious food products. Vegetable components such as tomatoes, peppers and the like are also particularly desirable dispersed phases, which may be incorporated in high weight percentage, if desired, in the manufacture of C-Gel sauces and flavorings.

As indicated, the composite C-Gel matrix compositions may desirably further comprise a dispersed fat phase. Such dispersed fat phase, when present, may typically be present at a level of at least about 2%, and usually in the range of from about 5 to about 30 weight percent, based on the total weight of C-Gel composite food products. Fat derived from milk, meat and seafood components, as well as vegetable fats such as soybean, coconut, palm kernel, sunflower, canola (rapeseed), peanut, corn, safflower, and cottonseed oils, as well as manufactured polyol polyesters, may desirably be used as the fat component. The fat component may be unhydrogenated, fully hydrogenated, partially hydrogenated or transesterified, depending upon the desired characteristic for the intended product. The melting point of the fat is not critical and can be varied depending upon the properties of the product desired. When utilized, the fat component is desirably uniformly dispersed throughout the gelatin-carrageenan continuous phase matrix. Generally such dispersion is carried out and maintained at least in part through the utilization of a suitable emulsification agent and appropriate processing steps, as will be more fully explained hereinafter.

As indicated, the C-Gel composite food products, particularly those which contain a dispersed fat component, may further comprise an emulsifying agent. Suitable emulsification agents include conventional emulsifiers such as mono and diglycerides, phospholipids, polysorbates, sorbitan esters and polyoxyl esters. Buttermilk powder, which includes a substantial phospholipid content (e.g., about 0.2 weight percent), is particularly preferred as an emulsifying agent in the preparation of C-Gel composite food products in which the delicate dairy flavor of buttermilk is desired. Even emulsification agents such as non-fat dry milk, whey (protein), casein or caseinates may also be used in certain compositions for emulsification effects.

Generally, emulsification agents will be present at an effective amount in the composition to achieve dispersion of the fat phase, which amount may typically be in the range of from about 0.2 to about 12 weight percent, based on the total weight of the composition, and dependent upon the types of emulsification agents used and the type of product being produced.

As indicated, the composite C-Gel matrix composition comprises a firm, aqueous carrageenan-gelatin continuous phase matrix, and in this regard, an appropriate amount of water is also an important component of the C-Gel composite food products of the present invention. Water may generally be present in the composite food products at a level of at least about 30 weight percent, and preferably in the range of from about 40 to about 70 weight percent, based on the total weight of the C-Gel composite food product. Typically, the water content will be in the range of from about 50 to about 70 weight percent of its total C-Gel composite food product. The water content of the carrageenan-gelatin continuous phase of the composite compositions may be different from the water content of the dispersed components, but will generally also be present at a level of at least about 50 percent, and preferably in the range of from 50 to about 95 weight percent, based on the total weight of the C-Gel continuous phase component of the food products.

A food grade acid component may be used in the C-Gel composite food products of the present invention to provide a product with a pH value in the range of from about 4.0 to about 6.0 and preferably from about 4.4 to about 5.7. Although maximum firmness of the kappa carrageenan - gelatin continuous phase aqueous matrix is provided at a pH of less than 5.0, the level of acidity may be adjusted to provide optimum flavor, and/or shelf life properties. Suitable food grade acids include adipic acid, citric acid, lactic acid, acetic acid, phosphoric acid and the like. It will be appreciated that acidic components may be incorporated into or may be inherent in ingredient components, or may be added as a separate component during manufacture of the food product to provide adjustment of the pH to the desired value.

Particularly preferred protein fiber or polysaccharide/protein complex fiber containing C-Gel products may desirably employ a cheese-flavored C-Gel matrix. In this regard, such products may include up to about 50 weight percent of a fermented dairy derived flavoring agent, based on the total weight of the C-Gel composite food product, such as a flavored cheese product or cheese product having an intensified American cheese flavor, as described in U.S. Pat. No. 4,172,900. When using such a highly intensified cheese product component, the component will desirably be present in an amount of from about 1% to about 8% based on the total weight of the C-Gel composite product. Cheese products in which a proteolytic micrococcus, a self-limiting lipase and a flavor culture are utilized in the make procedure are also particularly desirable. The casein and other protein components of such flavoring agents may be substantially hydrolyzed.

Generally in accordance with the present invention, methods are also provided for manufacture of C-Gel composite food products comprising the steps of providing from about 1 to about 12 parts by weight of a gelatin having a water content of less than about 11% and a bloom strength of at least about 125 in finely divided form having a particle size of less than about 40 mesh, providing at least about 0.5 parts by weight of kappa carrageenan having a water content of less than about 12% in finely divided form having a particle size of less than about 60 mesh such that the carrageenan and gelatin have a carrageenan-gelatin weight ratio in the range of from about 1:6 to about 3:1, dry basis, providing from about 2 to about 30 parts by weight of a blending component selected from the group consisting of an edible fat, a dry, powdered carbohydrate, and mixtures thereof, and blending the gelatin and carrageenan with the blending component. When using an edible fat blending component, the blending should best be carried out at a temperature at or above the melting point or melting range of the fat component. The carrageenan and gelatin are blended with the blending component to provide a homogeneous mixture in which the carrageenan and gelatin are dispersed in the blending component. Emulsifiers and other non-aqueous optional ingredients such as flavorings, antimycotics, stabilizers and coloring may desirably be blended with the carrageenan and gelatin together with the blending component. The homogeneously blended mixture may subsequently be combined with the dispersed food component together with enough water to provide from about 30 to about 80 parts by weight of water in the final product, and salts such as sodium chloride and sodium citrate, if desired, to form a pre-mix. Alternatively, it may be desirable to delete a portion or all of the water or the dispersed food component and add these ingredients directly at the cooker. The pre-mix and any ingredients added at the cooker are mixed and heated to at least about 70° C. with an optional emulsifying salt and then are cooled to a temperature of less than about 10° C. to provide a structurally firm continuous phase aqueous carrageenan-gelatin matrix having a dispersed food product homogeneously distributed therein. The optional emulsifying salt may be incorporated in the pre-mix, preferably as the last ingredient used. If a food grade acid is used it may be dissolved in the pre-mix water or it may be added to the other ingredients prior to, during or after the heating process. When an animal or vegetable fat is not used, the carrageenan and gelatin may be gradually blended into a moist food component at about 5° to 25° C. in such a manner so as to prevent lumping of the carrageenan and gelatin due to too rapid hydration.

A further advantage of the gelatin-carrageenan matrix is that it melts when sufficient heat is applied, which does not occur with many other hydrocolloid, protein or hydrocolloid-protein food systems. In accordance with the present invention, C-Gel composite food products may be readily provided which are firm at refrigeration temperature (i.e., 45° F.) and which may exhibit desirable melt characteristics at elevated temperatures.

Specific embodiments of the present invention are also directed to methods for manufacturing individually wrapped slices ("IW hot pack") at elevated temperatures. The individually wrapped C-Gel composite slices may desirably have extended refrigerator shelf life provided by pasteurization within such individual packages. The term "slice" is used broadly herein to include products in sheet form, however manufactured. The slice products in accordance with such methods may be prepared directly in sheet form, and are not physically cut into sheet from from a larger form.

In accordance with method aspects of the present invention, methods for manufacturing individually wrapped, single slice, firm bodied C-Gel composite food products are provided comprising the steps of preparing a viscous, fluid C-Gel food composite as previously described, at an elevated temperature of at least about 155° F. and preferably at least 160° F., forming a packaging film tube, and introducing the C-Gel composite fluid into the packaging film tube at an elevated temperature. The tube may be longitudinally sealed (e.g., fin or overlap seal), or may be overlapped without sealing, depending upon the desired package configuration. Full hydration and dispersion of carrageenan may occur at temperatures in excess of 165° F. (e.g., 170° F.–180° F. or more) to fully pasteurize the product (and complete heat setting polysaccharide/protein fibers if desired) while maintaining the composite properties of the product. Further in accordance with the invention, the C-Gel composite is displaced from a cross sealing zone and the packaging film tube is transversely cross sealed to provide a sealed package. The C-Gel composite fluid may be cooled in the film tube prior to displacing the C-Gel composite and cross sealing the tube. In order to provide extended shelf life, C-Gel composite products which are sensitive to spoilage may be packaged in substantially gas impermeable wrappers. By substantially gas impermeable is meant that the packaging film is substantially free of pinholes and has a moisture vapor transmission rate (MVTR) of less than 0.9 grams of moisture per 100 square inches of the packaging film at atmospheric pressure at 100° F. and 90% relative humidity per 24 hours, and preferably less than about 0.4 grams/100 in$^2$/24 hours. A plurality of the individually wrapped slices may be stacked together and overwrapped with a substantially gas impermeable packaging film to provide a consumer package having excellent storage stability and convenience.

As indicated, in accordance with certain aspects of methods of the present invention, a viscous, C-Gel composite mixture may be prepared for further use in manufacture of novel food products. The blend may be "heat-settable" or thermoreversible. It is a particular advantage of certain embodiments, that the blend be thermoreversible, to provide for product manufacture and to produce a sliced product which may readily be melted if desired by the consumer. However, blends may also be prepared which are heat settable. By "heat-settable" is meant that the C-Gel composite blend is initially a viscous, flowable form, and is transformed into a form stable condition, for example by heating a composite C-Gel blend containing an emulsified natural meat component to a protein denaturation temperature. Heat settable C-Gel blends may be particularly desirable for certain types of C-Gel meat products where product melting at elevated temperatures is not desired. When producing wrapped slices as previously described, it is desirable for C-Gel compositions including substantial portions of vegetable, fruit or polysaccharide/protein complex fibers and/or natural meat components, that the fiber size be limited, and that the composite mixture have stability and flow characteristics which facilitate cross sealing of the packaging film tube without substantial retention of fibers or other composite C-Gel components in the cross seal zone. The C-Gel composite fluid composition used in IW hot pack processes in accordance with the present invention is effectively non-syneresing, because the components are substantially fully retained in the finished product slices. By "non-syneresing" is meant that free water is not substantially expressed from the product.

A non-syneresing, C-Gel composite mixture may be provided by appropriate component selection such that the water content of the product is retained in the form stabilized slice products during cooling and product storage. The continuous C-Gel phase provides a high degree of syneresis control. In addition, a heat-activatable starch product may be included in the composite mixture which does not substantially absorb water below its heat activation range, but which gels and absorbs water at or above such temperature range. The amount of heat-activatable starch utilized may be selected based on the C-Gel composite blend, and in this regard, may desirably be in the range of from about 0.5 to about 8 percent by weight based on the total weight of composite blend.

A longitudinally sealed packaging film tube is preferably formed for C-Gel products where maximum protection is desired. By "longitudinally sealed" is meant that the film tube is continuously sealed about a cross section through its longitudinal axis.

The heated, C-Gel composite fluid is introduced into the film tube, which is longitudinally sealed, or overlapped. The film tube may be substantially sterile, and by placing the C-Gel composite fluid in contact with the film while hot (e.g., at least at pasteurization temperature), a substantially microorganism free film-slice interface may be provided. In this regard, the heated composite fluid may be placed on the film before the film tube is longitudinally sealed, but is preferably extruded through a discharge nozzle adjacent or internally of a zone of continuous film tube formation, to form a continuous, longitudinally sealed packaging film having the C-Gel fluid enclosed therein. The tube and enclosed composite C-Gel fluid will be formed as a continuous sheet or ribbon having a width generally corresponding to the width of the C-Gel composite single slice product to be produced. The film tube may typically have a width in the range of from about 2 to about 5 inches and a thickness in the range of from about 1/16th inch to about 3/16ths inch.

The C-Gel composite fluid is displaced from a cross sealing zone and the packaging film tube is transversely sealed at the cross sealing zone to provide a sealed package. The sealed package and the heated C-Gel composite fluid contained therein are subsequently cooled to provide firm-bodied C-Gel composite food product slices. The film tube containing the C-Gel composite fluid may, if desired, be at least partially pre-cooled before cross sealing.

It is particularly desirable in accordance with the present invention, that the C-Gel composite fluid be heated to pasteurization temperature and introduced under sterile or aseptic conditions within the substantially hermetically sealed, individually wrapped single slice package. Accordingly, wrapped slices may be prepared which are not exposed to the atmosphere until the wrapping is removed by the consumer.

Figure 7:
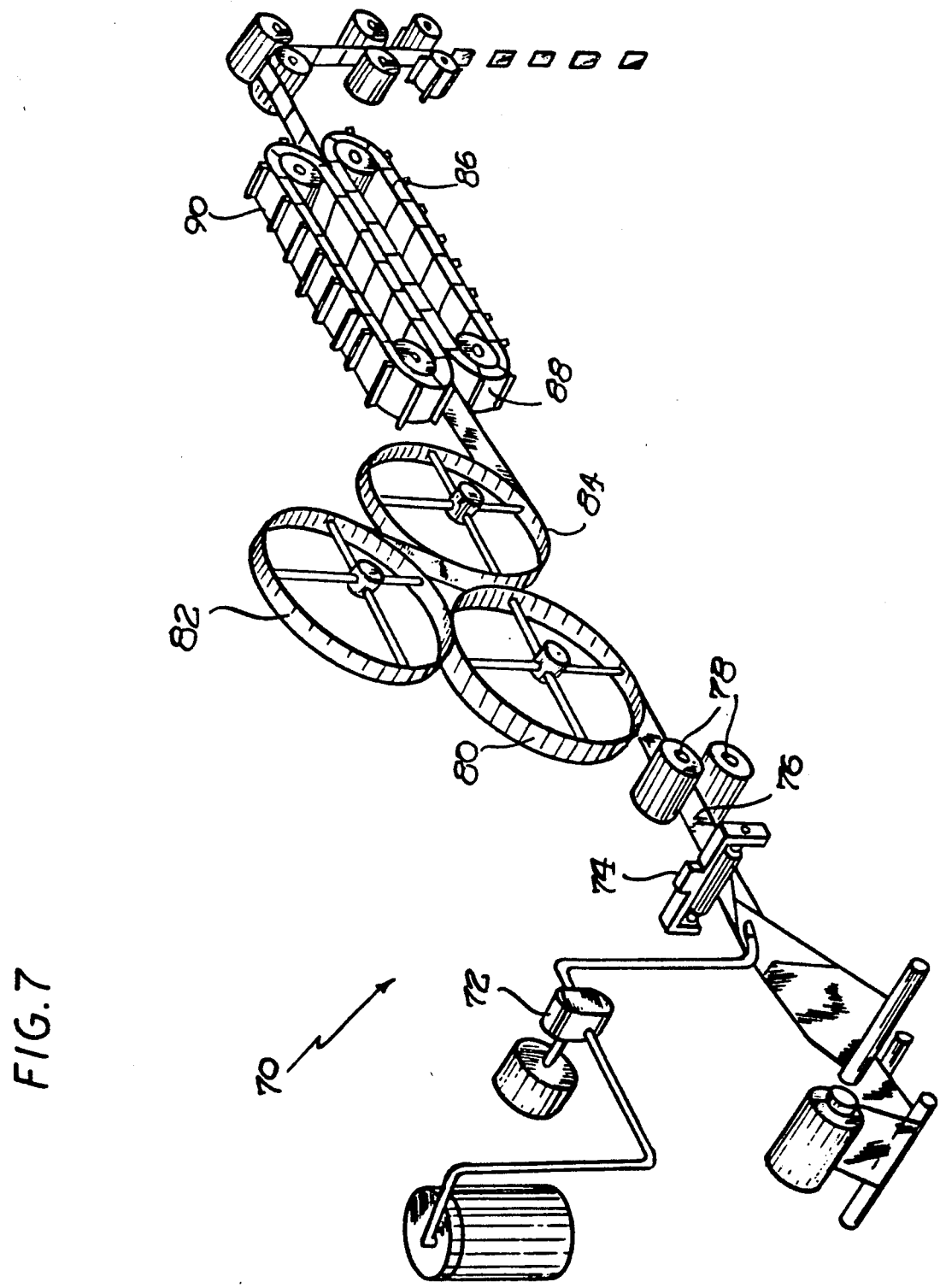
FIG. 7 is a schematic illustration of a hot packaging apparatus for producing individually wrapped slices of C-Gel products in accordance with various embodiments of the present invention.

Individually wrapped slice, hot-pack packaging apparatus 70 for carrying out such packaging is illustrated in FIG. 7. The C-Gel food product to be packaged is heated to a pasteurization temperature, which pasteurizes the product and provides it in a fluid condition for packaging. The heated product, which may desirably be vacuum deaerated, is pumped from storage by positive metering pump 72 at a precisely controlled rate to an extruding nozzle at film forming station 74, which comprises a packaging film dispensing apparatus for a continuous roll of heat sealable wrapping material. The wrapping material is continuously formed into a wrapping material tube 76 of substantially constant diameter, into which the fluid, heated C-Gel composite food product is discharged by the extrusion nozzle, which is positioned within the tube. Sizing rolls 78 may be provided to flatten the tube 76 and enclosed C-Gel composite food product composition to a desired product thickness, which may generally be in the range of from about 1/16 to about 3/16 inch for the illustrated apparatus 70. The flattened tube 76 passes around several thermal conditioning wheels 80, 82, 84 where the C-Gel composition within the film tube and its contents are cooled, and then is transported to a voiding and sealing station 86 comprising two opposing arrays 88, 90 of voiding and sealing elements, respectively, of the type described in U.S. Pat. No. 4,586,317 which is incorporated herein by reference. In the sealing station, the packaging film (which has an inner, heat sealing layer) is transversely sealed at spaced apart intervals corresponding to the spacing intervals of the voiding and sealing elements of the station 88. For high-speed operation, the cross sealed film tube may be subsequently further cooled, if desired, by thermal conditioning wheels like wheels 80, 82, 84, and may be subsequently cut apart at the cross seal midline to produce slices of C-Gel composite food products which are sealed for freshness and keeping quality within individual packages. It will be appreciated that the pasteurized C-Gel pre-mix may be aseptically packaged in this manner for exceptional keeping quality of the slices.

Having generally described various aspects of the present invention, the invention will now be more particularly described with respect to specific C-Gel composite food products described by the following examples.

EXAMPLE 1

A C-Gel matrix composition including a small amount of a dispersed fat phase was prepared having the following composition:

| C-Gel Matrix | | |
|---|---|---|
| Ingredients | Weight Percent | Grams |
| Kappa Carrageenan | 3.75 | 90.0 |
| Partially hydrogenated soybean oil (margarine-type fat) (liquid at 100° F.) | 5.00 | 120.0 |
| Gelating (250 Bloom) | 7.50 | 180.0 |
| Water | 73.25 | 1,758.0 |
| Lemon Juice | 2.50 | 60.0 |
| Steam Condensate | 8.00 | 192.0 |
| | 100.00 | 2,400.0 |

In preparing the matrix composition, a C-Gel matrix pre-mix was prepared by first mixing the kappa carrageenan and the margarine fat components, then blending in the gelatin and finally mixing in the water and lemon juice components. The fat was included in the C-Gel matrix composition and pre-blended with the carrageenan to prevent the kappa carrageenan and gelatin from lumping when the water-lemon juice components were added. The blended components were cooked to a final temperature by 180° F. by direct steam injection into the blend. After cooking and final stirring, samples were taken for viscosity measurements at 80° C. (176° F.). The remainder was poured into a 5 pound loaf and placed in a 42° F. cooler. After several days in the cooler, Texture Profile Analysis (TPA) was conducted at 45° F. and 72° F.

A beef analog C-Gel protein fiber composite food product was similarly prepared utilizing a C-Gel matrix like that described hereinabove, together with synthetic xanthan-protein fibers and flavoring components to produce a beef analog C-Gel composite food product as follows:

| Ingredients | Weight Percent | Grams |
|---|---|---|
| Partially hydrogenated soybean oil (margarine-type fat) (liquid at 100° F.) | 4.00 | 96.0 |
| Kappa Carrageenan | 1.50 | 36.0 |
| Gelatin (250 bloom) | 3.00 | 72.0 |
| Non-Fat Dry Milk | 6.00 | 144.0 |
| Sorbic Acid | 0.25 | 6.0 |
| 4 Amino Acid Mixture | 0.20 | 4.8 |
| Vegetable Salt Flavoring | 0.50 | 12.0 |
| Stirred Curd Cheese | 25.00 | 600.0 |
| Beef Flavor | 5.00 | 120.0 |
| Water | 24.50 | 588.0 |
| Lemon Juice | 0.75 | 18.0 |
| Lactic Acid (85%) | 0.30 | 7.2 |
| Sodium Citrate | 1.00 | 24.0 |
| Synthetic Protein Fibers (28% solids) | 20.00 | 480.0 |
| Steam Condensate | 8.00 | 192.0 |
| | 100.00 | 2,400.0 |

The synthetic polysaccharide/protein complex fibers were prepared from Xanthan gum, egg albumen, and whey protein in a 1:4:4 nominal weight ratio, as described in U.S. Pat. Nos. 4,563,360 and 4,559,233. A relatively high degree of agitation was used to produce relatively short fibers (approximately 1 cm.). A pre-mix was prepared by blending the above ingredients in the descending order shown, through and including the sodium citrate. The pre-mix was steam heated to 180° F. by direct steam injection. The protein fibers were gradually added to the blend at a temperature range of 130° F.–150° F. After heating to 180° F., samples were taken of the composite product for viscosity measurements at 80° C. The remainder of the batch was poured into a 5-pound loaf and placed in a 42° F. cooler. After several days in the cooler, Texture Profile Analysis (TPA) was conducted on the C-Gel Composite Product at 45° F. and 72° F. The product had an excellent flavor and a desirable texture. Products may similarly be prepared using lambda carrageenan and/or carboxymethyl cellulose as previously described in full or partial substitution for the xanthan gum, to produce the fibrous component.

As indicated viscosities were measured immediately following the preparation of the materials using the Haake Rotovisco RV12, a concentric cylinder viscometer, fitted with the MVI rotor for the C-Gel matrix sample and with the MVIII rotor for the beef flavored meat analog sample.

Viscosity data were obtained, in poise, at 80° C. (176° F.) on the C-Gel matrix from shear rates of 2.37 $s^{-1}$ to 75.8 $s^{-1}$. At shear rates above 75.8 $s^{-1}$ the viscosity test data became unreliable due to the Weissenberg ("rod-climbing") effect which is frequently observed in liquids that are highly elastic. Two viscosity measurement runs were performed. Viscosity data at the measured shear rates are tabulated in the following table:

| C-Gel Matrix Viscosity at 80° C. | | |
|---|---|---|
| Log Shear Rate | Run #1 Log Viscosity | Run #2 Log Viscosity |
| 0.376 | 1.242 | 1.325 |
| 0.677 | 1.175 | 1.240 |
| 0.978 | 1.117 | 1.164 |
| 1.279 | 1.062 | 1.110 |
| 1.580 | 1.018 | 1.052 |
| 1.881 | 0.948 | 0.975 |

In a similar manner, viscosity data, in poise, were obtained at 80° C. (176° F.) on the beef flavored meat analog sample. It was necessary to make the measurements at lower shear rates (0.08 $s^{-1}$ to 4.94 $s^{-1}$) due to limitations of the Haake RV12. Two runs were also made on this sample. The viscosity data for the fiber-containing product are tabulated in the following table.

| C-Gel Composite Viscosity at 80° C. | | |
|---|---|---|
| Log Shear Rate | Run #1 Log Viscosity | Run #2 Log Viscosity |
| −1.112 | 3.913 | 4.387 |
| −0.811 | 3.724 | 4.174 |
| −0.510 | 3.529 | 3.953 |
| −0.209 | 3.330 | 3.746 |
| 0.092 | 3.122 | 3.495 |
| 0.393 | 2.888 | |
| 0.694 | 2.666 | |

The Run #1 data is believed to be more reliable for both samples, due respectively to moisture loss or to the onset of gelation in the sample.

Texture Profile Analysis (TPA) measurements were performed on the samples after they had been cooled and stored for several days at 42° F. to evaluate the texture of the C-Gel matrix and C-Gel composite samples. In the TPA testing, a cylindrical plug is placed between parallel platens and force is recorded as it is subjected to two successive compression cycles to 80% of the original height of the plug. Eight parameters are obtained from the resultant force-compression curves: force at point of fracture (FAPOF), strain at point of fracture (POF), fracturability (FRAC), hardness (HARD), springiness (SPR), cohesiveness (COHEV), gumminess (GUM) and chewiness (CHEW).

The Instron testing apparatus was generally utilized in accordance with the procedure described by Bourne in "Texture Profile Analysis", Food Technology, July, 1978, p. 62, et. seq. In the testing, the cylindrical samples of the C-Gel matrix and the C-Gel composite food product which were 21 mm in diameter and 25 mm in height, were twice compressed at a constant (upper platen) velocity of 100 mm/minute by an Instron Universal Testing Machine, Model 1122 (manufactured by the Instron Corporation, Canton, Mass.) to a thickness of 5 mm. Measurements of the force in kilograms versus the deformation distance for the first compression cycle are charted as shown in FIGS. 1-4, which are graphic representations of the force versus compression distance data for the C-Gel matrix and beef analog product samples at the two-test temperatures of 72° F. and 45° F., respectively, as shown. The maxima in the curves are the fracture points of the samples. When a sample has been compressed to 1/5 of its original height, the deformation is stopped, the force removed and then reapplied. The force is mathematically normalized to the expanding (with compression) area of the cheese cylinder by assuming a cylindrical shape for the compressed cheese cylinder (which during the actual run may have a truncated cone shape, rather than a cylindrical shape) to determine a normalized force per unit area or stress value. At the higher temperature (72° F.), the products are softer. The composite beef analog C-Gel product with dispersed synthetic protein fibers was softer than the C-Gel matrix products, it is believed because of interaction of the fibers with the structure of the gel matrix. The measured and calculated texture profile values of Fracturability, Hardness, Springiness, Cohesiveness, Gumminess and Chewiness are set forth in the following tables.

| C-Gel Matrix at 72° F. | | | | |
|---|---|---|---|---|
| | FAPOF (KG/CMCM) | POF (% DEF) | FRAC (KG) | HARD (KG) |
| | 2.71 | 51.7 | 19.6 | 12.9 |
| | 2.22 | 51.3 | 16.0 | 10.5 |
| | 2.54 | 51.4 | 18.3 | 14.4 |
| | 2.53 | 52.0 | 18.4 | 10.9 |
| MEAN | 2.50 | 51.6 | 18.1 | 12.2 |
| SD | 0.20 | 0.3 | 1.5 | 1.8 |
| % SD | 8.16 | 0.6 | 8.4 | 15.0 |
| | SPR (MM) | COHEV | GUM (KG) | CHEW |
| | 4.00 | 0.046 | 0.6 | 663. |
| | 3.84 | 0.047 | 0.5 | 568. |
| | 3.90 | 0.050 | 0.7 | 650. |
| | 4.06 | 0.045 | 0.5 | 588. |
| MEAN | 3.95 | 0.047 | 0.6 | 617. |
| SD | 0.10 | 0.002 | 0.1 | 46. |
| % SD | 2.50 | 4.596 | 18.4 | 7. |

| C-Gel Matrix at 45° F. | | | | |
|---|---|---|---|---|
| | FAPOF (KG/CMCM) | POF (% DEF) | FRAC (KG) | HARD (KG) |
| | 4.29 | 57.0 | 35.8 | 13.9 |
| | 4.14 | 56.1 | 33.8 | 23.1 |
| | 4.57 | 60.6 | 42.2 | 31.6 |
| MEAN | 4.33 | 57.9 | 37.3 | 22.9 |
| SD | 0.22 | 2.4 | 4.4 | 8.8 |
| % SD | 5.04 | 4.2 | 11.8 | 38.6 |
| | SPR (MM) | COHEV | GUM (KG) | CHEW |
| | 4.10 | 0.032 | 0.4 | 1119. |
| | 4.48 | 0.054 | 1.3 | 1128. |
| | 4.93 | 0.052 | 1.6 | 1359. |
| MEAN | 4.50 | 0.046 | 1.1 | 1202. |
| SD | 0.42 | 0.012 | 0.6 | 136. |
| % SD | 9.23 | 26.447 | 55.0 | 11. |

| C-Gel Beef Analog Composite at 72° F. | | | | |
|---|---|---|---|---|
| | FAPOF (KG/CMCM) | POF (% DEF) | FRAC (KG) | HARD (KG) |
| | 0.34 | 38.2 | 2.0 | 7.2 |
| | 0.30 | 32.2 | 1.5 | 6.8 |
| | 0.53 | 35.8 | 3.2 | 9.3 |
| | 0.43 | 28.0 | 2.4 | 7.6 |
| MEAN | 0.40 | 33.6 | 2.3 | 7.7 |
| SD | 0.10 | 4.4 | 0.7 | 1.1 |
| % SD | | | | |
| | SPR (MM) | COHEV | GUM (KG) | CHEW |
| | 2.78 | 0.089 | 0.6 | 178. |
| | 3.14 | 0.096 | 0.7 | 174. |
| | 3.74 | 0.092 | 0.9 | 253. |
| | 3.58 | 0.081 | 0.6 | 214. |
| MEAN | 3.31 | 0.090 | 0.7 | 205. |
| SD | 0.43 | 0.006 | 0.1 | 37. |
| % SD | 13.14 | 7.096 | 16.1 | 18. |

| C-Gel Beef Analog Composite at 45° F. | | | | |
|---|---|---|---|---|
| | FAPOF (KG/CMCM) | POF (% DEF) | FRAC (KG) | HARD (KG) |
| | 0.94 | 37.9 | 5.5 | 14.2 |
| | 0.95 | 41.3 | 6.0 | 11.8 |
| | 1.09 | 46.4 | 7.4 | 15.4 |
| | 0.97 | 41.7 | 6.1 | 13.4 |
| MEAN | 0.99 | 41.8 | 6.2 | 13.7 |
| SD | 0.07 | 3.5 | 0.8 | 1.5 |
| % SD | 7.03 | 8.4 | 12.9 | 10.9 |
| | SPR (MM) | COHEV | GUM (KG) | CHEW |
| | 3.78 | 0.091 | 1.3 | 431. |
| | 3.87 | 0.084 | 1.0 | 407. |
| | 4.13 | 0.096 | 1.5 | 465. |
| | 3.87 | 0.086 | 1.2 | 420. |
| MEAN | 3.91 | 0.089 | 1.2 | 431. |
| SD | 0.15 | 0.005 | 0.2 | 25. |
| % SD | 3.86 | 6.025 | 16.8 | 6. |

As set forth in the previously referred to paper, the Fracturability of a sample is defined as the force at the first significant break in the force-compression distance curve. The Hardness of a sample is defined as the peak force during the first compression cycle, and the Cohesiveness is defined as the ratio of the positive force area under the curve during the second compression to that during the first compression. The Springiness is defined as the height that the sample recovers during the time that elapses between the end of the first compression cycle and the start of the second cycle. The Gumminess is defined as the product of Hardness and Cohesiveness, while the Chewiness is defined as the sum of the positive force areas under the curve during the first and second compressions. The Point of Fracture (POF) is defined as the compression at which the first significant break occurs in the normalized texture profile analysis, stress versus strain curve. The Force at the Point of Fracture (FAPOF) is defined as the stress corresponding to the POF. Samples of the C-Gel matrix and the Beef Analog C-Gel product were also examined by transmission electron microscopy and light microscopy.

Figure 8:
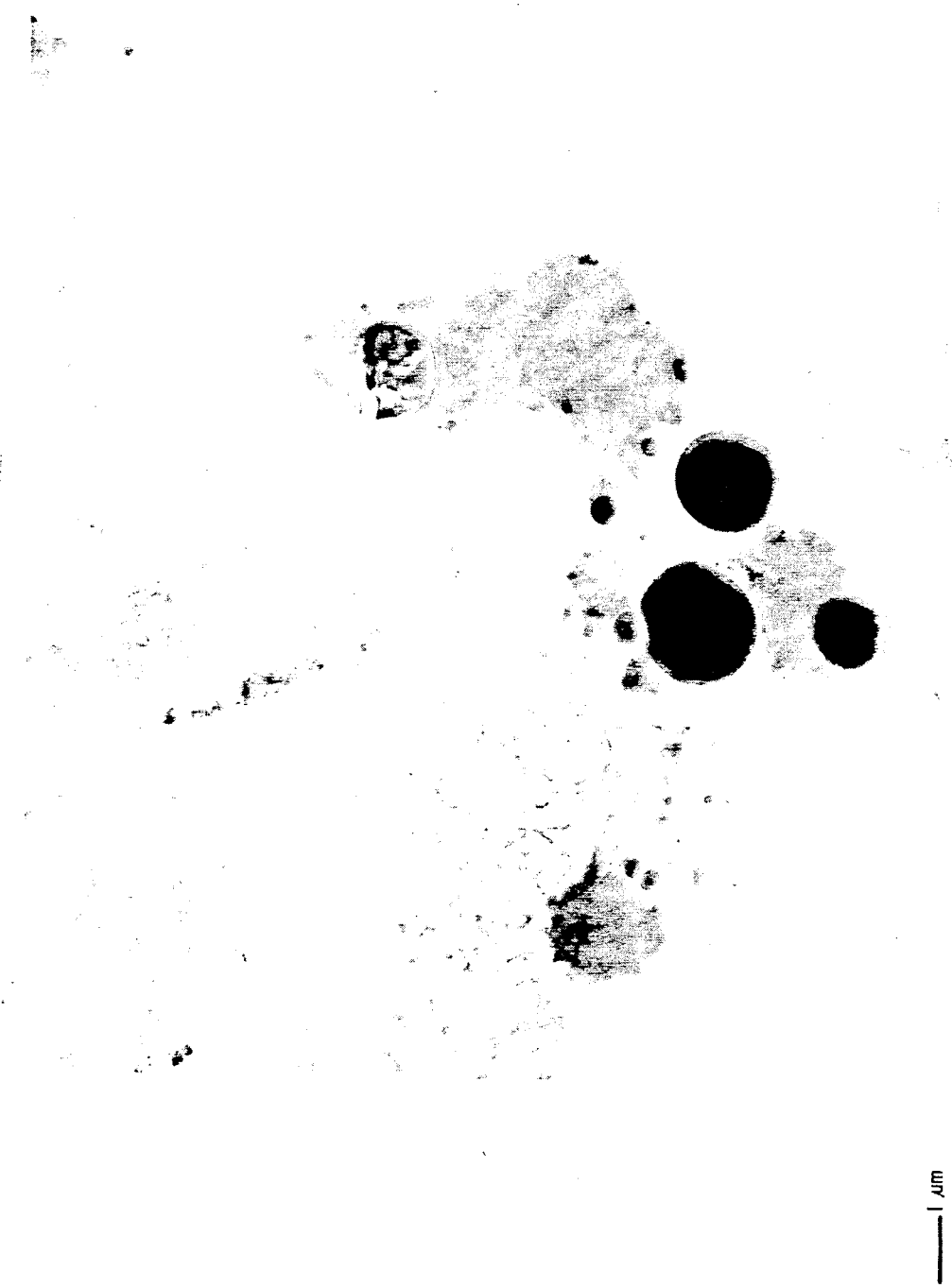
FIG. 8 is a transmission electron photomicrograph of the C-Gel matrix of FIG. 1 at a magnification of 13,000.
Figure 9:
FIG. 9 is a transmission electron photomicrograph of the C-Gel fiber composite product of FIG. 3 at a magnification of 13,000 for comparison with FIG. 8.

FIG. 8 is a transmission electron photomicrograph of the C-Gel matrix at a magnification of 13,000, and FIG. 9 is a transmission electron photomicrograph of the beef analog C-Gel fiber composite at a magnification of 13,000 for comparison with FIG. 8.

Figure 10:
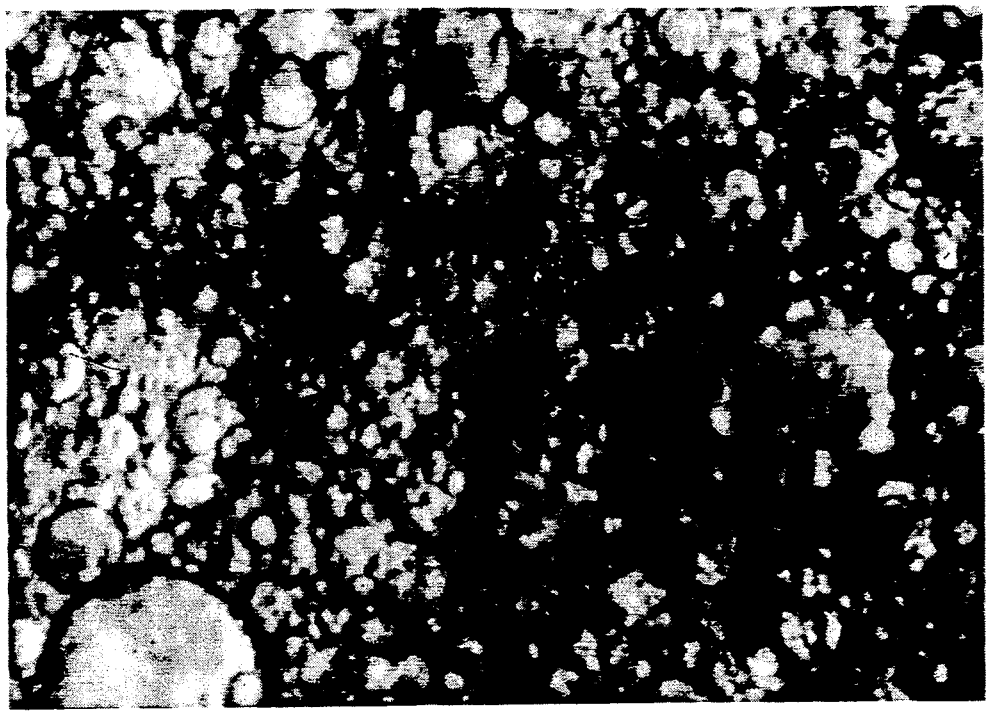
FIG. 10 is a photomicrograph of the C-Gel matrix of FIG. 1 at a magnification of 200, and FIG. 11 photomicrograph of the C-Gel fiber composite product of FIG. 3 at a magnification of 200 for comparison with FIG. 10.
Figure 11:
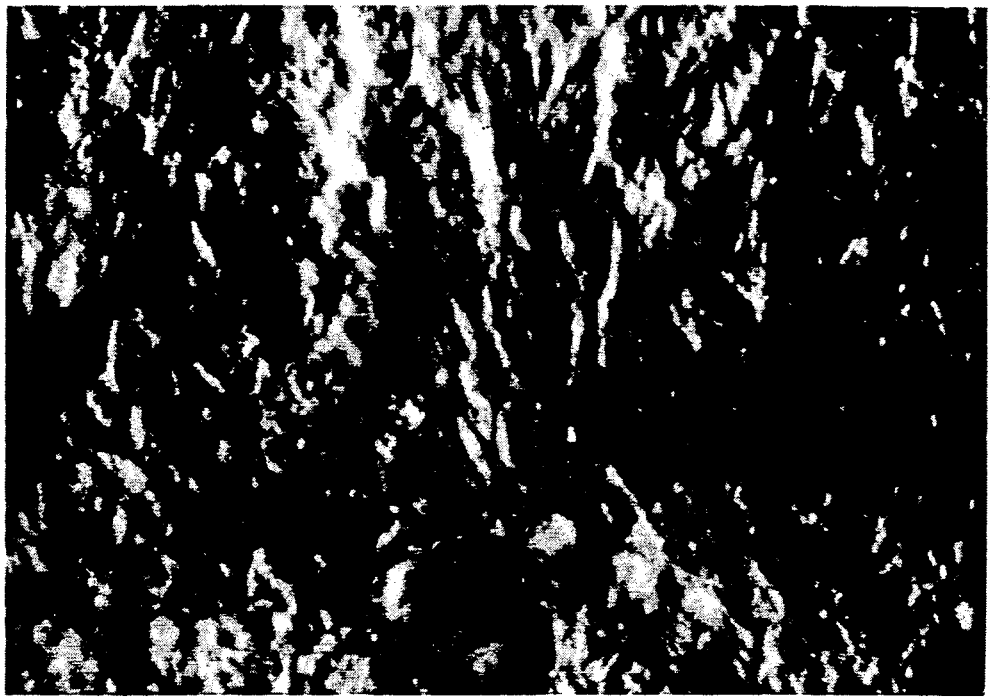

Similarly, FIG. 10 is a photomicrograph of the C-Gel matrix at a magnification of 200, and FIG. 11 is a photomicrograph of the beef analog C-Gel fiber composite product at a magnification of 200 for comparison with FIG. 10, illustrating its fibrous texture.

Having described certain physical parameters of specific embodiments of a C-Gel matrix and a C-Gel protein fiber composite food product, the invention will be further described with respect to specific, preferred embodiments of C-Gel composite food products. A number of tomato-containing C-Gel composite food products, which may be utilized as hot or cold sandwich components or the like, may be prepared in accordance with the present invention, as illustrated by the following examples:

EXAMPLE 2

A pizza sauce C-Gel composite was prepared from the following ingredients:

| Ingredients | % | Grams |
| --- | --- | --- |
| Gelatin (250 Bloom) | 4.5 | 108.0 |
| Kappa Carrageenan | 1.5 | 36.0 |
| Partially hydrogenated soybean oil (margarine type fat, liquid at 100° F.) | 4.75 | 114.0 |
| Non-Fat Dry Milk | 3.00 | 72.0 |
| Pizza Spice Blend | 2.50 | 60.0 |
| Sorbic Acid | 0.25 | 6.0 |
| Sucrose | 2.75 | 66.0 |
| Tomato paste | 50.0 | 1200.0 |
| Water | 20.0 | 480.0 |
| Sodium Chloride | 2.25 | 54.0 |
| Steam Condensate | 8.50 | 204.0 |
| | 100.0% | 2400.0 |

The pizza sauce C-Gel composite product was prepared in a manner similar to that used to prepare the composite product of Example 1. In this regard, a premix was prepared by blending the above ingredients in the descending order shown, through and including the sodium chloride. Tomato paste typically contains about 75 percent by weight water. The blended components of the pre-mix were heated with stirring by direct steam injection to 180° F., with the steam condensate, as shown, being incorporated into the heated product. During the heating step, the carrageenan and gelatin were fully dispersed throughout the aqueous phase of the product, and the product was fully pasteurized. The heated product was then poured into a 5-pound loaf form and placed in a 42° F. cooler. After the product was fully cooled, it was subsequently sliced in a conventional meat slicer to provide rectangular pizza sauce slices of about 3¼"×3½"×⅛" dimension. The cooled product exhibited excellent slicing characteristics.

The slices were tested together with a pre-baked pizza crust of dimension 4½"×4½"×¼" and a mozzarella/provalone cheese slice of similar dimension to the composite C-Gel pizza sauce slices. These components, together with the C-Gel pizza sauce slice, formed a convenience food pizza snack kit. The crust, cheese slice and C-Gel pizza sauce slice may each be individually wrapped to preserve freshness, and combined in a pizza kit package. To use the C-Gel pizza sauce pizza kit components, the cold C-Gel pizza sauce slice was placed atop the crust, and the cold mozzarella/provalone cheese slice was placed atop the pizza sauce slice. The layered components were subsequently heated for 45 seconds in a microwave oven (or alternatively for 4 minutes in a 400° F. horizontal toaster oven) to melt the sauce and cheese slices. The resulting pizza snack had excellent flavor and texture. Accordingly, it will be appreciated that the C-Gel pizza slice product and pizza kit of this example provides a means by which a consumer may rapidly and conveniently prepare a fresh, hot pizza snack.

The present invention is also particularly useful for providing meat or meat analog C-Gel composite products having excellent processing, manufacturing and convenience characteristics. In this regard, C-Gel beef, pork, seafood and poultry products may be produced, having a variety of characteristics which are particularly suitable for hot and cold sandwiches, as well as other convenience food applications, as demonstrated by the following examples:

EXAMPLE 3

Two chili C-Gel composite products were prepared, respectively, from the following ingredients:

| Ingredients | Weight % | Grams |
| --- | --- | --- |
| C-Gel Chili Product No. 1 | | |
| Partially hydrogenated soybean oil (margarine type fat, liquid at 100° F.) | 4.75 | 114.0 |
| Kappa Carrageenan | 1.00 | 24.0 |
| Gelatin (250 Bloom) | 4.00 | 96.00 |
| Sorbic Acid | .25 | 6.0 |
| Chili Sauce* | 82.00 | 1968.0 |
| Steam Condensate | 8.00 | 192.0 |
| | 100.00 | 2400.0 |
| *Hormel Brand Beef Chili without beans | | |
| C-Gel Chili Product No. 2 | | |
| Partially hydrogenated soybean oil (margarine type fat, liquid at 100° F.) | 4.75 | 114.0 |
| Carrageenan GP911 | 1.50 | 36.0 |
| Gelatin (40 Mesh) | 3.50 | 84.0 |
| Sorbic Acid | 0.25 | 6.0 |
| Chili Sauce* | 90.00 | 2160.0 |
| | 100.00 | 2400.0 |

*Kraft Brand Chili Hot Dog Sauce with Meat (Beef)

The composite C-Gel chili product No. 1 was prepared in substantially the same manner as the product of Example 2, with blending of the ingredients in the order shown, followed by direct steam injection with mixing to heat the blend to 175° F., followed by cooling in loaf form. The composite C-Gel product No. 2 was prepared in a similar manner, except that the blended components were heated indirectly by steam to 180° F. with stirring, and the heated product was cooled to 42° F. in a 2½" diameter cylindrical casing, rather than in rectangular loaf form. Both products sliced readily on a conventional meat slicer.

Slices of each product were placed in contact with a double meat patty hamburger. The slices were easily melted by placing the hamburger-chili slice assembly in a microwave oven for 40-45 seconds to rapidly and conveniently produce a "chili burger" having excellent taste characteristics.

EXAMPLE 4

A tomato solids containing barbeque sauce C-Gel composite product was prepared having the following ingredients:

| Ingredients | Weight % | Grams |
|---|---|---|
| Partially hydrogenated soybean oil (margarine type fat, liquid at 100° F.) | 4.25 | 102.0 |
| Kappa Carrageenan GP911 | 2.00 | 48.0 |
| Gelatin (250 Bloom) | 3.50 | 84.0 |
| Non Fat Dry Milk | 1.50 | 36.0 |
| Sorbic Acid | 0.25 | 6.0 |
| BBQ Sauce (pH 4.05)* | 80.00 | 1920.0 |
| Steam Condensate | 8.50 | 204.0 |
| | 100.00 | 2400.0 |

*Acid-reduced Kraft Bulls-Eye Brand BBQ Sauce

The BBQ sauce C-Gel product was prepared in a manner substantially the same as the Pizza sauce product of Example 2. After cooling overnight at 42° F., the cooled loaf product was sliceable, but it was softer in texture than the pizza sauce product of Example 2. The slices are suitable for rapid melting on hot dogs, chicken, pork or other products which advantageously may utilize a BBQ sauce. Firmness of the product may be increased by using higher levels of carrageenan/gelatin, if desired.

EXAMPLE 5

A composite C-Gel roast beef product with BBQ sauce was prepared containing the following ingredients:

| Roast Beef with C-Gel BBQ Sauce | | |
|---|---|---|
| Ingredients | Percent | Grams |
| Kappa Carrageenan GP911 | 1.50 | 36.0 |
| Gelatin (40 Mesh) | 2.00 | 48.0 |
| Partially hydrogenated soybean oil (margarine type fat, liquid at 100° F.) | 2.00 | 48.0 |
| Non-Fat Dry Milk | 1.50 | 36.0 |
| Sorbic Acid | 0.25 | 6.0 |
| 4 Amino Acid Mixture | 0.25 | 6.0 |
| Vegetable Salt | 1.00 | 24.0 |
| Acid Reduced Kraft Bull's Eye BBQ Sauce | 31.00 | 744.0 |
| Steam Condensate | 8.00 | 192.0 |
| Roast Beef (¼" × ¼" × ⅛" pieces) | 52.50 | 1260.0 |
| | 100.00 | 2400.0 |

This product was prepared by blending the listed ingredients in descending order through and including the BBQ sauce component to form a pre-mix. The pre-mix was heated by direct steam injection to a temperature of 105°-130° F., followed by addition of the meat piece with continued steam heating and mixing to a temperature of 180°-185° F. The heated composite product was placed, in 5-pound loaf form, in a cooler at 42° F. It was noted that the heated product had proper fluidity for a hot pack system, such as shown in FIG. 7. However, the cooled product sliced well on a meat slicer and had very good beef and BBQ sauce flavor when eaten cold. Slices were heated for 25-45 seconds on a slice of bread, or for 6 minutes in a 400° F. horizontal toaster oven to conveniently provide a hot BBQ beef sandwich.

EXAMPLE 6

A composite C-Gel roast pork product with BBQ sauce was prepared from the following ingredients:

| Roast Pork with C-Gel BBQ Sauce | | |
|---|---|---|
| Ingredients | Weight Percent | Grams |
| Kappa Carrageenan | 1.00 | 24.0 |
| Gelatin (250 Bloom) | 1.50 | 36.0 |
| Partially hydrogenated soybean oil (margarine type fat, liquid at 100° F.) | 1.50 | 36.0 |
| Non-Fat Dry Milk | 1.50 | 36.0 |
| Sorbic Acid | 0.25 | 6.0 |
| 4 Amino Acid Mixture | 0.25 | 6.0 |
| Vegetable Salt | 1.00 | 24.0 |
| Acid-Reduced Kraft Bull's Eye BBQ Sauce | 25.00 | 600.0 |
| Steam Condensate | 8.00 | 192.0 |
| Roast Pork (¼" × ¼" × ⅛" pieces) | 60.00 | 1440.0 |
| | 100.00 | 2400.0 |

A pre-mix was prepared in the same manner as in Example 5 by first blending the top 3 ingredients together, then mixing in the next 4 ingredients, and finally blending in BBQ Sauce. The pre-mix and about half of the roast pork were steam heated to about 130° F., the rest of the pork was added to the cooker, and the final cook temperature was 186° F. After stirring to 175° F., the batch (which had suitable fluidity for a hot pack system) was poured into a 5 lb. loaf and placed in a 42° F. cooler.

The cooled product sliced adequately on a meat slicer. The slices had good flavor, both cold and after heating on white bread for 25-45 seconds in a microwave oven or 6 minutes at 400° F. in a horizontal toaster oven.

EXAMPLE 7

A composite C-Gel product containing pre-fried bacon bits was prepared from the following components:

| C-Gel Fried Bacon Bits Product | | |
|---|---|---|
| Ingredients | % | Grams |
| Kappa Carrageenan | 1.00 | 24.0 |
| Gelatin (250 Bloom) | 2.00 | 48.0 |
| Partially hydrogenated soybean oil (margarine type fat, liquid at 100° F.) | 4.00 | 96.0 |
| Buttermilk Powder | 5.00 | 120.0 |
| Sorbic Acid | 0.25 | 6.0 |
| 4 Amino Acid Mixture | 0.25 | 6.0 |
| Vegetable Salt | 0.50 | 12.0 |
| Water | 33.00 | 792.00 |
| Lactic Acid (85%) | 0.25 | 6.0 |
| Sodium Citrate | 0.75 | 18.0 |
| Steam Condensate | 8.00 | 192.0 |
| Rendered Bacon Bits (pre-fried) | 45.0 | 1080.0 |
| | 100.0 | 2400.0 |

A pre-mix was prepared by blending the top three ingredients, and then blending in each ingredient in descending order through and including the sodium citrate. The pre-mix was then heated by direct steam injection with gradual addition of the rendered bacon bits, to a temperature of 175° F. to provide a heated, pumpable blend which was poured into a 5-pound loaf form and placed in a cooler at 42° F. After cooling, the product was found to have a pH of about 5.75, and sliced well on an automatic meat slicer. The product had very good flavor when eaten cold.

A slice of the product was also heated in buttered bread on a grill with a slice of process cheese to prepare a grilled cheese and bacon sandwich also having very good flavor. The cold strength of the product may be increased, if desired, by increasing the content of carrageenan and gelatin.

EXAMPLE 8

A number of sliceable products were prepared employing various meat products dispersed in a C-Gel composite cheese sauce base. The C-Gel cheese sauce base had the following composition:

| Ingredients | Total Product Weight % | Grams |
|---|---|---|
| Partially hydrogenated soybean oil (margarine type fat, liquid at 100° F.) | 2.00 | 280.0 |
| Kappa Carrageenan | 0.75 | 105.0 |
| Gelatin (40 Mesh) | 1.50 | 210.0 |
| Non Fat Dry Milk | 3.00 | 420.0 |
| Sorbic Acid | 0.20 | 28.0 |
| 4 Amino Acid Mixture | 0.10 | 14.0 |
| Mild American Cheese | 15.00 | 2100.0 |
| Water | 7.00 | 980.0 |
| Thawed Lemon Juice | 0.75 | 105.0 |
| Lactic Acid (85%) | 0.20 | 28.0 |
| Sodium Citrate | 0.50 | 70.0 |
| Sodium Chloride | 0.50 | 70.0 |
| | 31.50 | 4410.0 |

For each different product, 40 weight percent of the above listed C-Gel base cheese sauce components (including steam heating condensate) was combined with 60 weight percent of a meat product component, to provide respective product compositions, as follows:

| Ingredients | Weight % | Grams |
|---|---|---|
| *Turkey in Cheese Sauce Product* | | |
| Above Cheese Sauce Pre-mix | 31.50 | 756.0 |
| Steam Condensate | 8.50 | 204.0 |
| Shredded Turkey (Cooked) | 60.00 | 1440.0 |
| | 100.00 | 2400.0 |
| *Baked Ham/Turkey in Cheese Sauce Product* | | |
| Above Cheese Sauce Pre-mix | 31.50 | 756.0 |
| Steam Condensate | 8.50 | 204.0 |
| Shredded Turkey (Cooked) | 30.00 | 720.0 |
| Shredded Baked Ham | 30.00 | 720.0 |
| | 100.00 | 2400.0 |
| *Bologna in Cheese Sauce Product* | | |
| Above Cheese Sauce Pre-mix | 31.50 | 756.0 |
| Steam Condensate | 8.50 | 204.0 |
| Shredded Cooked Bologna | 60.00 | 1440.0 |
| | 100.00 | 2400.0 |
| *Salmon in Cheese Sauce Product* | | |
| Above Pre-mix | 31.50 | 756.0 |
| Steam Condensate | 8.50 | 204.0 |
| Canned Red Salmon Pieces | 60.00 | 1440.0 |
| | 100.00 | 2400.0 |
| *Salami in Cheese Sauce Product* | | |
| Above Pre-mix | 31.50 | 756.0 |
| Steam Condensate | 8.50 | 204.0 |
| Shredded Cured Salami | 60.00 | 1440.0 |
| | 100.00 | 2400.0 |

Each product was prepared by blending the base cheese sauce pre-mix ingredients in the descending order shown, followed by direct steam injection heating. The meat component was added with stirring as the temperature reached about 120°–130° F., with a final cook temperature of 180° F. The heated products were filled into 5-pound loaf forms and cooled to 42° F. in a cooler. All of the products were readily sliceable by a conventional meat slicer to provide slices which could be eaten cold, or after heating.

EXAMPLE 9

A chicken with gravy C-Gel composite product was prepared to further demonstrate the utility of the invention in respect to poultry-containing products. In this regard, a product was prepared having the following composition:

| Chicken with Gravy C-Gel Product | | |
|---|---|---|
| Ingredients | Weight % | Grams |
| Partially hydrogenated soybean oil (margarine type fat, liquid at 100° F.) | 4.25 | 102.0 |
| Kappa Carrageenan | 1.50 | 36.0 |
| Gelatin (250 Bloom) | 3.50 | 84.0 |
| Sorbic Acid | 0.25 | 6.0 |
| Canned Chicken Spread (diced chicken and gravy) | 82.00 | 1968.0 |
| Steam Condensate | 8.50 | 204.0 |
| | 100.00 | 2400.0 |

The product was prepared in a manner similar to the previous example by blending the top 4 ingredients together. Then about ¼ of the chicken spread was mixed in to complete the pre-mix. The rest of the chicken spread was gradually added to the cooker during steam heating to 180° F. The heated product was filled into a 5 lb. loaf form at 175° F. and subsequently cooled to 42° F. The cooled product was sliceable and suitable for use in sandwiches.

EXAMPLE 10

A C-Gel product having a variety of different components including prepared meatballs with pineapple and gravy was prepared in a manner similar to the previous examples. The ingredients of this product were:

| Ingredients | % | Grams |
|---|---|---|
| Kappa Carrageenan | 1.00 | 24.0 |
| Partially hydrogenated soybean oil (margarine type fat, liquid at 100° F.) | 2.75 | 66.0 |
| Gelatin (250 Bloom) | 2.50 | 60.0 |
| Sorbic Acid | 0.25 | 6.0 |
| Gravy (from Meatballs) | 16.67 | 400.0 |
| Steam Condensate | 8.50 | 204.0 |
| Canned Crushed Pineapple | 10.00 | 240.0 |
| Quartered Meat Balls | 58.33 | 1400.0 |
| | 100.00 | 2400.0 |

The top 5 ingredients were blended together, in descending order to form a pre-mix. The pre-mix and the crushed pineapple were steam heated to 130° F., then the meat balls were gradually added with continued steam heating until 180° F. Was reached. The heated C-Gel product blend was filled into a 5 lb. loaf at 175° F., and cooled to 42° F. to provide a sliceable product suitable for sandwiches.

As indicated by Example 8, seafood-containing C-Gel products may be provided which have very desirable manufacturing, convenience and flavor characteristics. The following additional examples of seafood products further illustrate the range of dispersed food components which may be provided in C-Gel matrices to provide novel food products in accordance with the present invention.

EXAMPLE 11

A crab analog product was manufactured, using individually wrapped hot pack equipment, having the following composition:

| Shredded Crab Analog - C-Gel Cheese Sauce | | |
|---|---|---|
| Ingredients | Weight % | Lbs. |
| Partially hydrogenated soybean oil (margarine type fat liquid at 100° F.) | 2.00 | 0.80 |
| Kappa Carrageenan | 0.75 | 0.30 |
| Gelatin (250 Bloom) | 1.50 | 0.60 |
| Non Fat Dry Milk | 3.00 | 1.20 |
| Sorbic Acid | 0.20 | 0.08 |
| 4 Amino Acid Mixture | 0.10 | 0.04 |
| Mild American Cheese | 15.00 | 6.00 |
| Water | 7.00 | 2.80 |
| Thawed Lemon Juice | 0.75 | 0.30 |
| Lactic Acid (85%) | 0.20 | 0.08 |
| Sodium Citrate | 0.50 | 0.20 |
| Sodium Chloride | 0.50 | 0.20 |
| Steam Condensate | 8.50 | 3.40 |
| Crab-Flavored Surimi | 60.00 | 24.00 |
| | 100.00 | 40.00 |

The crab-flavored surimi was cut in a Urschel RA Dicer set to give a 1/16"×⅛"×⅛" shred and run at high speed. A pre-mix was prepared by mixing each ingredient together with the others in descending order (up to the steam condensate). Direct steam and mixing were applied to the pre-mix. When the temperature reached about 120°-130° F., the shredded crab flavored surimi was gradually added to the cooker. The final cook temperature was 176° F. The well emulsified product was readily packaged and cooled in a hot pack packaging apparatus of the type illustrated in FIG. 7 with about 1.25 oz. (36 grams) per individually wrapped slice. The final product had good flavor both cold and melted over a toasted, buttered English muffin, and excellent storage stability.

EXAMPLE 12

A crab analog C-Gel composite product in seafood cocktail sauce was prepared having the following composition:

| Ingredients | % | Grams |
|---|---|---|
| Partially hydrogenated soybean oil (margarine type fat, liquid at 100° F.) | 2.69 | 64.56 |
| Kappa Carrageenan | 1.00 | 24.00 |
| Kappa-Lambda Carrageenan Mixture (2:1 weight ratio, approx.) | 1.00 | 24.00 |
| Gelatin (250 Bloom) | 1.00 | 24.00 |
| Non-Fat Dry Milk | 1.50 | 36.00 |
| Vitamin E and Related Tocopherols | 0.01 | 0.24 |
| Sorbic Acid | 0.30 | 7.20 |
| Mustard Flour | 0.50 | 12.00 |
| Seafood Cocktail Sauce (Crosse and Blackwell) | 20.00 | 480.00 |
| Lemon Juice | 2.50 | 60.00 |
| Citric Acid | 0.25 | 6.00 |
| Vegetable Salt | 1.25 | 30.00 |
| Steam Condensate | 8.00 | 192.00 |
| Crab-Flavored Surimi | 60.00 | 1440.00 |
| | 100.00 | 2400.00 |

The product was prepared in a manner similar to Example 10 by blending the ingredients in the order listed. The pre-mix and about ⅓ of the surimi crab analog were mixed and steam heated to about 120° F., the remainder of the surimi was gradually added. After heating to 180° F., the product was filled into a 5-pound loaf form at 175° F. and subsequently cooled at 42° F. The cooled product is sliceable and has excellent flavor.

EXAMPLE 13

A tuna salad seafood product was prepared from the following ingredients:

| C-Gel Tuna Salad | | |
|---|---|---|
| Ingredients | Weight Percent | Grams |
| Kappa Carrageenan | 1.00 | 24.00 |
| Kappa-Lambda Carrageenan Mixture (2:1 weight ratio, approx.) | 1.00 | 24.00 |
| Partially hydrogenated soybean oil (margarine type fat, liquid at 100° F.) | 2.74 | 65.76 |
| Gelatin (250 Bloom) | 1.00 | 24.00 |
| Vitamin E and Related Tocopherols | 0.01 | 0.24 |
| Sorbic Acid | 0.25 | 6.00 |
| Vegetable Salt | 1.00 | 24.00 |
| Canned Tuna Juice | 10.00 | 240.00 |
| Lemon Juice | 1.00 | 24.00 |
| Citric Acid | 0.50 | 12.00 |
| Diced Celery (¼" × ¼" × ¼") | 13.50 | 324.00 |
| Drained Fragmented Tuna | 50.00 | 1200.00 |
| Mayonnaise | 10.00 | 240.00 |
| Steam Condensate | 8.00 | 192.00 |
| | 100.00 | 2400.00 |

A pre-mix was prepared for the above product by mixing the ingredients together in the descending order shown, including about ¾ of the tuna meat. Direct steam heat and stirring were applied to the pre-mix. During heating the remainder of the tuna was added to the blend. The final cook temperature was 180° F. The product was poured into a 5 lb. loaf at 175° F. and stored at 42° F.

The cooled product was readily sliced in a meat slicer. The resulting slices were made into cold tuna salad sandwiches having excellent flavor.

C-Gel composite products comprising a dispersed flavored fat base are particularly desirable products. The following examples describe C-Gel fat based products and methods for preparing such products.

EXAMPLE 14

Slices of a yogurt-cream cheese C-Gel product were manufactured by IW hot pack equipment, having the following composition:

| Yogurt - Cream Cheese - C-Gel Hot Pack Slices | | |
|---|---|---|
| Ingredients | Weight % | Pounds |
| Anhydrous Butterfat (melted) | 10.0 | 2.00 |
| Gelatin (250 Bloom) | 2.5 | 0.50 |
| Kappa Carrageenan | 1.3 | 0.26 |
| Buttermilk Powder | 5.5 | 1.10 |
| Sorbic Acid | 0.2 | 0.04 |
| High (20%) Solids Yogurt | 40.0 | 8.00 |
| Sodium Citrate | 2.0 | 0.40 |
| Sodium Chloride | 0.5 | 0.10 |
| Cream Cheese | 30.0 | 6.00 |
| Steam Condensate | 8.0 | 1.60 |
| | 100.0 | 20.00 |

Two 20 lb. pre-mixes (minus the condensate) were prepared from the above formula by first blending the top 5 ingredients together and then blending in the yogurt, sodium citrate, salt, and cream cheese (in order). The two pre-mixes were mixed together and steam heated to 175° F. in a cooker. The batch was recycled to 168° F. and it was very smooth. Then it was packaged and cooled in a hot pack system such as illustrated in FIG. 7, to provide individually wrapped slices of a yogurt-cream cheese C-Gel composite product. The final cooled product had a desirable yogurt flavor and texture.

After equilibration in a cooler for several days, the above product had a pH of 5.31 and 56.72% moisture.

EXAMPLE 15

Individually wrapped slices of a chocolate-flavored C-Gel product was prepared in a manner similar to Example 14, having the following composition:

| Chocolate Flavored C-Gel | | |
|---|---|---|
| Ingredients | Weight % | Lbs. |
| Gelatin (250 Bloom) | 2.0 | 1.50 |
| Kappa Carrageenan | 1.0 | 0.75 |
| Anhydrous Butterfat at 100° F. | 3.00 | 2.25 |
| Sodium Chloride | 0.4 | 0.30 |
| Water | 26.0 | 19.50 |
| Buttermilk Powder | 8.0 | 6.00 |
| Emulsifier (Atmos 150) | 0.4 | 0.30 |
| Sorbic Acid | 0.2 | 0.15 |
| Condensate | 9.0 | 6.75 |
| Nestle's Broc. Milk Chocolate (in pieces) | 50.0 | 37.50 |
| | 100.0 | 75.00 |

The product was prepared by blending the ingredients (down through the Sorbic Acid) in the descending order shown and transferring the non-chocolate components to an 80-lb. laydown cooker. Direct steam and mixing were applied. After the temperature rose to about 120° F. the chocolate pieces were gradually added to the cooker. The steam heating was continued throughout the chocolate addition and was finally stopped at 175° F. A portion of the batch was packaged in an apparatus such as shown in FIG. 7 to provide individually wrapped slices of the chocolate-flavored product. Another portion of the product was automatically packaged into a wrapped, stick form, 5" long and ⅝" in diameter. The finished products were quite smooth and had a delicious chocolate flavor.

EXAMPLE 16

A C-Gel salad dressing product was prepared from the following ingredients:

| C-Gel Salad Dressing Slices | | |
|---|---|---|
| Ingredients | Weight Percent | Grams |
| Kappa Carrageenan | 2.000 | 48.0 |
| Gelatin (250 Bloom) | 3.500 | 84.0 |
| Soybean Oil | 26.000 | 624.0 |
| Liquid Egg Yolks (Past.-Salted) | 4.500 | 108.0 |
| Paprika (Ground) | 0.0125 | 0.3 |
| Oleoresin Black Pepper | 0.0125 | 0.3 |
| Spice Mix | 0.100 | 2.4 |
| Water } Pre Blend | 38.125 | 915.0 |
| Vinegar, White 120 grain | 5.000 | 120.0 |
| Sucrose | 11.250 | 270.0 |
| NaCl | 1.500 | 36.0 |
| Steam Condensate | 8.000 | 192.0 |
| | 100.000 | 2400.0 |

A pre-mix was made for the above product by first blending the top 3 ingredients together and then mixing in each ingredient (except the condensate) in the descending order shown.

The pre-mix was stirred and steam heated to 171° F. The very fluid product set-up rapidly when cooled. It was poured into a 5 lb. loaf and placed in a 42° F. cooler. It had a pH of 4.01.

The C-Gel salad dressing product had a firm, rubbery texture, sliced very well on a meat slicer, and had an excellent flavor.

EXAMPLE 17

A chocolate cream cheese flavored C-Gel composite product was prepared from the following components:

| Chocolate Cream Cheese Flavored C-Gel Product | | |
|---|---|---|
| Ingredients | % | Grams |
| Gelatin (250 Bloom) | 1.50 | 36.0 |
| Kappa Carrageenan | 0.75 | 18.0 |
| Emulsifier (Atmos 150) | 0.25 | 6.0 |
| Sorbic Acid | 0.25 | 6.0 |
| Buttermilk Powder | 2.00 | 48.0 |
| Partially hydrogenated soybean oil (margarine type fat, liquid at 100 F.) | 4.25 | 102.0 |
| Cream Cheese | 37.00 | 888.0 |
| Steam Condensate | 9.00 | 225.0 |
| Nestle's Broc. Chocolate | 45.00 | 1080.0 |
| | 100.00 | 2500.0 |

The product was prepared by blending the ingredients (down through the cream cheese) in the descending order shown to form a pre-mix. The pre-mix was steam heated to 180 F. During the cooking, the chocolate pieces were added to the cooker. The product was sealed in a 5 pound loaf and cooled to 42° F. The product sliced well and had excellent flavor.

C-Gel composite products which contain natural fruit are particularly desirable novel products. The following examples illustrate a variety of different C-Gel fruit products.

EXAMPLE 18

An excellent banana flavored C-Gel composite product was prepared from the following ingredients:

| Banana C-Gel Product | | |
|---|---|---|
| Ingredients | Weight % | Grams |
| Gelatin (250 Bloom) | 3.00 | 75.0 |
| Kappa Carrageenan | 1.30 | 32.5 |
| Emulsifier (Atmos 150) | 0.50 | 12.5 |
| Sorbic Acid | 0.30 | 7.5 |
| Buttermilk Powder | 9.00 | 225.0 |
| Sodium Chloride | 0.40 | 10.0 |
| Partially hydrogenated soybean oil (margarine type fat, liquid at 100° F.) | 12.20 | 305.0 |
| Frozen Banana Puree w/20% sucrose | 64.00 | 1600.0 |
| Nat. Banana Flavor | 0.30 | 7.5 |
| Steam Condensate | 9.00 | 225.0 |
| | 100.00 | 2500.0 |

The product was prepared by blending together the ingredients in the order shown. The blend was cooked to 180° F., stirred to 172° F. and jelled into a 5 lb loaf form in a 42° F. cooler, as previously described. The product slices well and has an excellent flavor.

EXAMPLE 19

An excellent apple-flavored C-Gel product was prepared in the same manner as in Example 18, from the following ingredients:

| Apple C-Gel Product | | |
|---|---|---|
| Ingredients | Weight % | Grams |
| Gelatin (250 Bloom) | 3.00 | 75.0 |
| Kappa Carrageenan | 1.30 | 32.5 |
| Emulsifier (Atmos 150) | 0.50 | 12.5 |
| Sorbic Acid | 0.30 | 7.5 |
| Buttermilk Powder | 9.00 | 225.0 |
| Sodium Chloride | 0.40 | 10.0 |
| Partially hydrogenated soybean oil (margarine type fat, liquid at 100° F.) | 12.20 | 305.0 |
| Apple Pie Filling (Thank You) | 64.00 | 1600.0 |
| Nat. Apple flavor | 0.30 | 7.5 |
| Steam Condensate | 9.00 | 225.0 |
| | 100.00 | 2500.0 |

EXAMPLE 20

An excellent mandarin orange flavored C-Gel composite product was prepared in the manner of Example 18, having the following ingredients:

| Mandarin Orange Flavored C-Gel Product | | |
|---|---|---|
| Ingredients | Weight % | Grams |
| Gelatin (250 Bloom) | 3.00 | 75.0 |
| Kappa Carrageenan | 1.30 | 32.5 |
| Emulsifier (Atmos 150) | 0.50 | 12.5 |
| Sorbic Acid | 0.30 | 7.5 |
| Buttermilk Powder | 9.00 | 225.0 |
| Sodium Chloride | 0.40 | 10.0 |
| Partially hydrogenated soybean oil (margarine type fat, liquid at 100° F.) | 12.00 | 300.0 |
| Mandarin Orange Base (Dunkirk) | 64.00 | 1600.0 |
| Mandarin Orange Flavor | 0.50 | 12.5 |
| Steam Condensate | 9.00 | 225.0 |
| | 100.00 | 2500.0 |

EXAMPLE 21

An excellent pineapple-flavored C-Gel product was prepared in a manner like that of Example 18 from the following ingredients:

| Pineapple Flavored C-Gel Product | | |
|---|---|---|
| Ingredients | Weight % | Grams |
| Gelatin (250 Bloom) | 3.00 | 75.0 |
| Kappa Carrageenan | 1.30 | 32.5 |
| Emulsifier (Atmos 150) | 0.50 | 12.5 |
| Sorbic Acid | 0.30 | 7.5 |
| Buttermilk Powder | 9.00 | 225.0 |
| Sodium Chloride | 0.40 | 10.0 |
| Partially hydrogenated soybean oil (margarine type fat, liquid at 100° F.) | 12.00 | 300.0 |
| Pineapple Cottage Cheese Base | 62.50 | 1562.5 |
| Pineapple Booster Flavor | 2.00 | 50.0 |
| Steam Condensate | 9.00 | 225.0 |
| | 100.00 | 2500.0 |

EXAMPLE 22

| Red Raspberry-Flavored C-Gel Slices and Sticks | | |
|---|---|---|
| Ingredients | Weight % | Pounds |
| Gelatin (250 Bloom) | 2.5 | 2.00 |
| Kappa Carrageenan | 1.2 | 0.96 |
| Emulsifier (Atmos 150) | 0.5 | 0.40 |
| Sorbic Acid | 0.3 | 0.24 |
| Buttermilk Powder | 9.5 | 7.60 |
| Partially hydrogenated soybean oil (margarine type fat, liquid at 100° F.) | 12.4 | 9.92 |
| Red Raspberry | 50.0 | 40.00 |
| Yogurt Flavor (59.5% solids) Petran Red Raspberry Sherbet Raspberry Booster Flavor | 2.0 | 1.60 |
| Water | 12.0 | 9.60 |
| Citric Acid | 0.2 | 0.16 |
| Sodium Chloride | 0.4 | 0.32 |
| Condensate | 9.0 | 7.20 |
| | 100.0 | 80.00 |

A pre-mix was prepared for this product by blending the top 5 ingredients and the oil together in a large Hobart mixer. These ingredients were then mixed with the raspberry base and booster flavor in a mixer. Finally, the citric acid-water solution and the salt were blended into the other ingredients. The batch was steam heated to 175° F., recycled to 165° F., and packaged in the hot pack system of FIG. 7. The final cooled, individually wrapped product slices had excellent flavor and a soft texture. Hot pack sticks were also made, of the type previously described.

EXAMPLE 23

Wrapped, peach flavored C-Gel slices were made from the following ingredients:

| Peach-Flavored C-Gel 1 W Slices | | |
|---|---|---|
| Ingredients | % | Pounds |
| Anhydrous Butterfat (100° F.) | 12.0 | 2.40 |
| Gelatin (250 Bloom) | 3.0 | 0.60 |
| Kappa Carrageenan | 1.3 | 0.26 |
| Emulsifier (Atmos 150) | 0.5 | 0.10 |
| Sorbic Acid | 0.3 | 0.06 |
| Buttermilk Powder | 9.0 | 1.80 |
| Peach Yogurt Flavor | 61.5 | 12.30 |
| Natural Peach Booster Flavor | 3.0 | 0.60 |
| Sodium Chloride | 0.4 | 0.08 |
| Steam Condensate | 9.0 | 1.80 |
| | 100.0 | 20.00 |

Enough pre-mix material was prepared in each of 2 Hobart mixers to make two-20-lb. batches by first blending together the top 6 ingredients and then blending in the peach base, the booster flavor, and the sodium chloride, in order. The 2 pre-blends were combined in a 40-lb. cooker and were steam heated to 175° F., mixed to 165° F., and packaged in the hot pack system of FIG. 7. After cooling, this product was a little weak in peach flavor, perhaps a little too sweet, and was a little soft in texture. These characteristics may readily be improved by formulation modification.

EXAMPLE 24

Individually wrapped slices of a strawberry-cream cheese C-gel product were prepared from the following components:

| Strawberry-Cream Cheese Flavored C-Gel 1 W Slices | | |
|---|---|---|
| Ingredients | % | Pounds |
| Anhydrous Butterfat (100 F.) | 8.00 | 1.60 |
| Gelatin (250 Bloom) | 2.00 | 0.40 |
| Kappa Carrageenan | 1.00 | 0.20 |
| Buttermilk Powder | 7.00 | 1.40 |
| Strawberry Yogurt Base Flavor | 30.00 | 6.00 |
| Natural Strawberry Booster Flavor | 2.00 | 0.40 |
| Sodium Citrate | 0.70 | 0.14 |
| Cream cheese (cool) | 40.00 | 8.00 |
| Sorbic Acid | 0.30 | 0.06 |
| Steam Condensate | 9.00 | 1.80 |
| | 100.00 | 20.00 |

The top 4 ingredients were blended together, followed by the last 5 ingredients, in order (the Na citrate was added before the cream cheese). Two pre-blends were made and combined, cooked, and packaged exactly as described with respect to Example 23.

After cooling, this product had very good strawberry-cream cheese flavor. The texture may be adjusted by replacing 0.5% of gelatin by 0.5% of buttermilk powder.

EXAMPLE 25

As described in Example 1, xanthan-protein fibers may be utilized in a C-gel matrix to produce novel food products. In this regard, a pineapple food product with desirable texture provided by synthetic fibers was prepared from the following components:

| Pineapple Fiber C-Gel Product | | |
|---|---|---|
| | Weight % | Grams |
| Partially hydrogenated soybean oil (margarine type fat, liquid at 100 F.) | 4.00 | 96.0 |
| Kappa Carrageenan | 1.50 | 36.0 |
| Gelatin (250 Bloom) | 2.50 | 60.0 |
| Non Fat Dry Milk | 6.00 | 144.0 |
| Sorbic Acid | 0.25 | 6.0 |
| 4 Amino Acid Mixture | 0.20 | 4.8 |
| Thawed Pineapple Concentrate (60% solids) | 25.00 | 600.0 |
| Pineapple flavoring | 7.58 | 182.0 |
| Crushed Pineapple (drained) | 25.00 | 600.0 |
| Thawed Lemon Juice | 0.75 | 18.0 |
| Lactic Acid (85%) | 0.30 | 7.2 |
| Sodium Citrate | 1.00 | 24.0 |
| Sodium Chloride | 1.00 | 24.0 |
| Steam Condensate | 8.00 | 192.0 |
| Short Synthetic Protein Fibers (as described in example 1) | 16.92 | 406.0 |
| | 100.00 | 2400.0 |

The product was prepared generally as described in Example 1, and had excellent slicing, texture and flavor characteristics.

EXAMPLE 26

A chicken-flavored C-Gel product was prepared using synthetic protein fibers as described in Example 1, with the following ingredients:

| Chicken Flavored Protein Fiber C-Gel Product | | | |
|---|---|---|---|
| Ingredients | | Percent | Grams |
| Kappa Carrageenan | | 1.50 | 36.0 |
| Gelatin (250 Bloom) | | 3.00 | 72.0 |
| Rendered Chicken Fat (melted) | | 7.50 | 180.0 |
| Chicken Flavoring | | 1.00 | 24.0 |
| Non-Fat Dry Milk | | 6.00 | 144.0 |
| Sorbic Acid | | 0.25 | 6.0 |
| 4 Amino Acid Mixture | | 0.25 | 6.0 |
| Mild American Cheese | | 25.00 | 600.0 |
| Water | Pre-disperse together | 24.50 | 588.0 |
| Thawed Lemon Juice | | 0.70 | 16.8 |
| Lactic Acid (85%) | | 0.30 | 7.2 |
| Sodium Citrate | | 1.00 | 24.0 |
| Vegetable Salt | | 1.00 | 24.0 |
| Steam Condensate | | 8.00 | 192.0 |
| Short Synthetic Protein Fibers (as described in Example 1) | | 20.00 | 480.0 |
| | | 100.00 | 2400.0 |

The product was prepared by first blending the top 3 ingredients together and then mixing in the remaining ingredients, in the descending order shown down through the vegetable flavored salt, to complete the pre-mix. Steam and mixing were applied to the pre-mix. The synthetic protein fibers were gradually added to the cooker in the temperature range of 140°-150° F. The final cook temperature was 180° F. The well emulsified batch was stirred to 175° F., poured into a 5 lb. loaf, and cooled to 42° F. The product had excellent clean chicken flavor and a nice chicken texture.

Although the invention has been described in considerable detail with reference to certain preferred embodiments thereof, it will be understood that variations and modifications can be affected within the spirit and scope of the invention as described above and as defined in the appended claims.

What is claimed is:

1. A method for manufacturing a packaged C-Gel composite food comprising steps of mixing and heating to at least pasteurization temperature components comprising at least about 30 weight percent water, at least about 1 weight percent gelatin, at least about 0.5 weight percent kappa carrageenan, and a dispersed food product selected from the group consisting of meat, seafood, fruit, vegetable, synthetic protein fibers, chocolate or mixtures thereof, to provide a fluid, heated packaging blend;

introducing the fluid, heated packaging blend into a packaging material tube to provide a C-Gel blend filled packaging tube; and cross sealing and severing the C-Gel filled packaging material tube to provide a plurality of individually wrapped C-Gel food products.

2. A method in accordance with claim 1 wherein said C-Gel filled packaging material tube is cooled prior to, concurrently with, or after said cross sealing and severing steps.

3. A method in accordance with claim 2 wherein said C-Gel filled packaging material tube is cooled prior to and after said cross sealing and severing step.

4. A method in accordance with claim 1 wherein said dispersed food product is meat which is a natural meat emulsion.

5. A C-Gel food product comprising at least about 0.5 weight percent kappa carrageenan, at least about 1.0 weight percent gelatin having a bloom strength of at least about 125, from about 3 to about 90 weight percent of a dispersed edible food product selected from the group consisting of meat, seafood, fruit, vegetable, synthetic protein fibers, chocolate or mixtures thereof, and from about 30 to about 80 weight percent of water, based on total product weight, said carrageenan and said gelatin being present in a structurally firm continuous carrageenan-gelatin phase at refrigeration temperature and said food component being dispersed in said continuous carrageenan-gelatin phase.

6. A C-Gel composite food product in accordance with claim 5 wherein said continuous carrageenan-gelatin phase has a pH in the range of from about 4.0 to about 6.0.

7. A C-Gel, composite food product in accordance with claim 5 wherein product is thermoreversibly meltable by heating.

8. A C-Gel composite food product in accordance with claim 5 wherein said gelatin has a bloom strength of at least 200.

9. A method of manufacturing a C-Gel composite food product comprising the steps of:

providing a gelatin having a water content of less than about 11 weight percent and a bloom strength of at least about 150 in finely divided form having a particle size of less than about 40 mesh, providing a kappa carrageenan having a water content of less than about 12 weight percent in finely divided form having a particle size of less than about 60 mesh;

blending the gelatin and carrageenan with an edible fat or fat containing product to provide a mixture comprising fat, gelatin and kappa carrageenan;

blending the mixture with water to form a pre-mix;

mixing and heating the pre-mix to at least about 70° C. to provide a heated pre-mix, blending a food component selected from the group consisting of meat, seafood, fruit, vegetable, synthetic protein fibers, chocolate or mixtures thereof in the pre-mix prior to, or concurrently with said heating step; and cooling the pre-mix to less than about 10° C. to provide a C-Gel composite product having a structurally firm continuous phase aqueous carrageenan-gelatin matrix having a dispersed food component homogeneously distributed therein.

10. A method in accordance with claim 9 wherein said gelatin and said carrageenan are blended with said edible fat or fat containing product at a temperature of at least about 10° C. and wherein the weight ratio of said kappa carrageenan to said gelatin is in the range of from about 1:6 to about 3:1.

11. A method for manufacturing a packaged C-Gel composite food comprising steps of mixing and heating to at least pasteurization temperature components comprising at least about 30 weight percent water, at least about 1 weight percent gelatin, at least about 0.5 weight percent kappa carrageenan, and a dispersed food product selected from the group consisting of meat, seafood, fruit, vegetable, synthetic protein fibers, chocolate or mixtures thereof, to provide a fluid, heated packaging blend;

introducing the fluid, heated packaging blend into a packaging form to provide a C-Gel blend filled packaging form; and cooling the product.

12. A method in accordance with claim 11 wherein said packaging form is a slice form, a loaf form, a packaging material tube, a tub form or a block form.

* * * * *